United States Patent [19]
Sinclair

[11] Patent Number: 5,865,942
[45] Date of Patent: Feb. 2, 1999

[54] SEAM WELDER

[76] Inventor: Frank Sinclair, 2766 Sleepy Hollow Ct., Placerville, Calif. 95667

[21] Appl. No.: 861,275

[22] Filed: May 21, 1997

Related U.S. Application Data

[63] Continuation-in-part of Ser. No. 599,937, Feb. 14, 1996, abandoned.

[51] Int. Cl.$^6$ .............................. B32B 35/00; B44C 7/00
[52] U.S. Cl. ......................... 156/499; 156/544; 156/555; 156/574; 156/579
[58] Field of Search .................................. 156/433, 436, 156/438, 443, 459, 461, 465, 468, 470, 475, 499, 555, 580, 583.1, 157, 502, 544, 574, 577

[56] References Cited

U.S. PATENT DOCUMENTS

| | | | |
|---|---|---|---|
| 3,005,484 | 10/1961 | Kuconis | 156/438 |
| 3,146,456 | 8/1964 | McGrath et al. | 156/438 X |
| 4,087,309 | 5/1978 | Lang | 156/497 |
| 4,146,419 | 3/1979 | Neidhart | 156/391 |
| 4,447,288 | 5/1984 | Seaman | 156/574 |
| 4,744,855 | 5/1988 | Ellenberger et al. | 156/499 |
| 4,834,828 | 5/1989 | Murphy | 156/359 |
| 4,855,004 | 8/1989 | Chitjian | 156/359 |
| 4,872,941 | 10/1989 | Lippman et al. | 156/497 |
| 4,913,772 | 4/1990 | Taylor et al. | 156/499 |
| 4,923,558 | 5/1990 | Ellenberger et al. | 156/498 |
| 4,950,352 | 8/1990 | Greller | 156/443 |
| 5,051,148 | 9/1991 | Resch | 156/358 |
| 5,091,038 | 2/1992 | Greller et al. | 156/497 |
| 5,328,545 | 7/1994 | Kaminski | 156/583.1 |
| 5,490,626 | 2/1996 | Kaminski | 228/44.3 |

FOREIGN PATENT DOCUMENTS

| | | |
|---|---|---|
| 0009015 | 3/1980 | European Pat. Off. . |
| 0541931 | 5/1993 | European Pat. Off. . |
| 738367 | 8/1943 | Germany . |
| 2138739 | 11/1983 | United Kingdom . |

OTHER PUBLICATIONS

Brochure; PFAFF; Mobile heat–sealing machines; no date.
Brochure; Columbine International, LTD.; "Wedge–It"; no date.

*Primary Examiner*—James Sells
*Attorney, Agent, or Firm*—Joseph E. Gerber

[57] ABSTRACT

A hot wedge, automatic seam welder is disclosed. The welder is comprised of a chassis having a base plate, a motor housing and a support arm extending from the motor housing. An S-shaped guide for guiding opposing sheets of material is between the base plate and the motor housing. Disposed downstream from the motor housing, depending from the support arm, is vertically-movable suspension for a driven upper pressure roller which is occludable with a driven lower pressure roller on the base plate. Also depending from the support arm is vertically-movable and adjustable suspension for the hot wedge. A horn-shaped shroud for guiding material over and under the wedge, and for shrouding the wedge when in its disengaged mode, is disposed upstream from the wedge. Guides for performing lap welds, fin welds and hem welds, as well as many variations thereupon, are also disclosed.

44 Claims, 15 Drawing Sheets

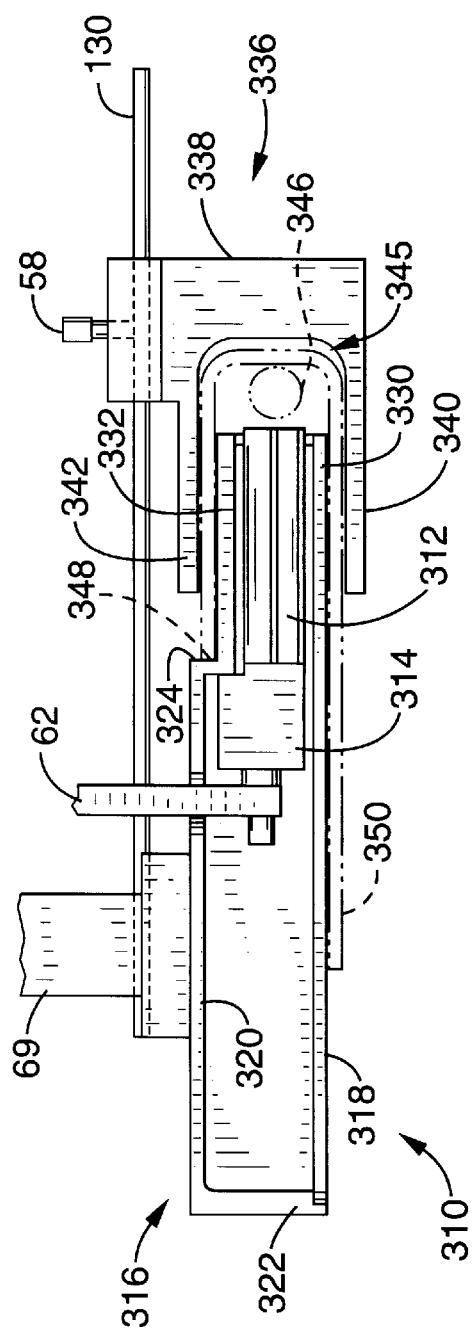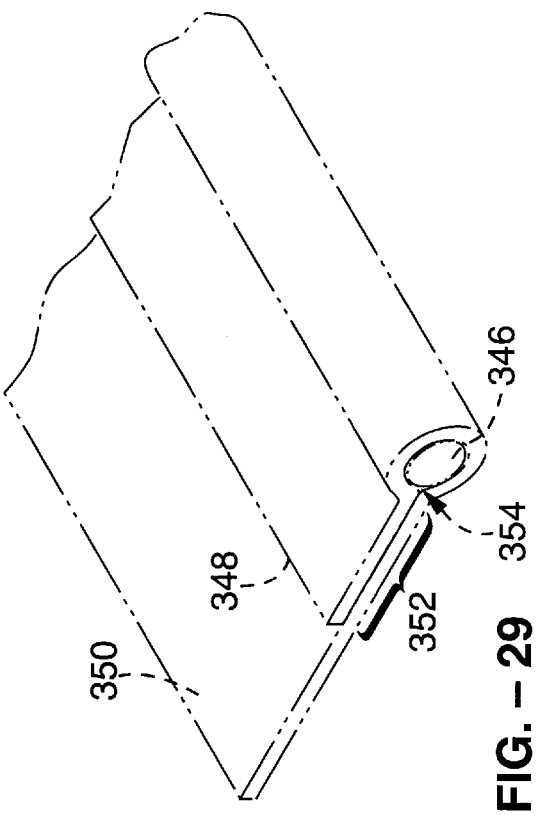

SEAM WELDER

CROSS REFERENCE TO RELATED APPLICATION

This is a Continuation-In-Part of application Ser. No. 08/599,937, filed Feb. 14, 1996 abandoned.

BACKGROUND OF THE INVENTION

1. Field of the Invention

The present invention relates generally to apparatus for welding plastics, and more specifically to apparatus for forming seams in sheet materials having weldable plastic components.

2. Description of the Related Art

Apparatus for welding seams in plasticized sheet materials generally include several basic components: infeed guides; a heating element; pressure rollers; and, a drive system for moving either the sheet material or the welder with respect to the other.

Sheets of weldable material are commonly joined to one another with either of two primary seam configurations: the lap weld; or, the fin weld (the fin weld also being known as the "prayer" weld). A third primary seam type, used in binding a sheet's edge to itself, is the hem weld. Variations on, or specific applications of, these three primary seam configurations can be used to create a range of different structures adapted to particular purposes, including; taped reinforcements; taped, butt-welded joints; sleeves; tubes; and, flaps. And, weldable sheet materials can be mated with other materials and structures to yield features useful in the arts to which sheet materials are applied. Examples include hem tubes through which ropes, chains, cables and the like pass for supporting and suspending sheets; and, hem cords (i.e. hem tubes with tightly-bound, semi-rigid rods inside) for anchoring sheet edges to mating channels cut in support structures.

However, currently available seam welders are unable to produce all of the three primary seam types, or are otherwise lacking features which would make them equally practical for creating all three types in an industrial setting. For example, U.S. Pat. No. 4,950,352 issued to Greller in 1990 shows a welder with its pressure rollers oriented for unlimited material widths distal to the rollers with respect to the chassis; but, Greller's chosen roller suspension leaves limited space between the rollers and the chassis, making it impractical for use in lap welding very wide sheets of material. Further, Greller's 1990 welder, being a "hot-air" welder, would suffer limitations inherent to that genus, i.e. being useful only for sheet materials of limited thickness, and being generally noisy.

U.S. Pat. No. 4,855,004 issued to Chitjian in 1989 shows a power-driven, hand-guided, hot-air welder adapted for lap welding seams of wide sheets of material on roof decks, and the like. Lap seams are the primary intended product of the Chitjian welder; fin and hem welds appear technically possible, but less practical for the lack of appropriate infeed guides. Further, being hand-guided, drawbacks of the Chitjian welder include the non-uniformity in welds caused by slight drive speed and direction changes, and great dependence upon the skill of the operator, as well as the previously-mentioned problems with hot-air welders.

Ellenberger, et al, in U.S. Pat. No. 4,774,855 issued in 1988 shows another lap-seam welder adapted for hand-guiding over surfaces covered in weldable sheeting. This is a "hot-wedge" welder, employing a wedge-shaped, high-temperature, electrically-powered metal heating element. Hot-wedge welders such as that shown in the Ellenberger, et al 1988 patent are generally more versatile and reliable in their ability to weld materials of different thicknesses. However, the welder of the Ellenberger, et al 1988 patent is limited by its infeed guide structure in the types of welds it can perform; lap welds are primarily provided-for, while fin and hem welds may be technically feasible to a limited, albeit impractical, extent.

Taped reinforcements and taped, butt-welded joints are the product of the radiant-heat, tape welder disclosed in U.S. Pat. No. 4,913,772 issued to Taylor, et al in 1990. These are lap weld variants are difficult to perform with some other welders. However, the welder of Taylor, et al lacks the infeed guide structure to permit welds of the other primary types.

Greller, et al, in U.S. Pat. No. 5,091,038 issued in 1992, discloses a hot wedge welder with guides for performing lap and hem welds, and fin welds also appear possible. The Greller 1992 welder is "automatic," i.e. self-propelled, and can therefore be run along a sheet's edge under its own power at a precise speed for an accurate and consistent weld. However, the limitations of the chassis construction, and especially the dimension of the arm upon which the hot wedge is mounted on the Greller, et al 1992 apparatus, make lap welding therewith cumbersome, and practical in only limited applications. Specifically, only when both sheets to be lap welded can be laid out distal to the rollers and chassis can extremely wide sheets be lap welded together, because the space between the rollers and chassis is limited. Thus, the Greller 1992 welder cannot be used for lap welding or taped butt-welding wide sheets laid out on a roof deck, for example. Further, Greller, et al's 1992 apparatus appears to be exceedingly dangerous in that its hot wedge, which operates at temperatures of 1000° F., or more, is not shielded to protect an operator from severe burns; and yet further, it projects menacingly from the apparatus when swung away from its welding position.

European Patent Application No. 79890022.1 filed by Winkler, et al in 1979 discloses a hot wedge welder illustrated as being capable of lap and fin welds, and which may have limited hem welding capability. The Winkler, et al welder employs an S-shaped chassis upon which opposed pressure rollers appear able to be mounted on either horizontal or vertical axes for either lap or fin welding, respectively. However, switching between roller orientations appears cumbersome, and would make precise centering of the hot wedge in the plane tangent to the point of roller occlusion difficult, wedge centering being quite important to the quality of the weld.

Methods and apparatus heretofore employed for constructing hem cords and for inserting ropes of cables in hem tubes are also inadequate. Most commonly, the hem is first constructed, and then a rope, cable or semi-rigid rod is threaded through the hem tube by hand. This task becomes exceedingly difficult when the hem tube is very long. And, even when a seam sealing machine's chassis includes a relieved area permitting a chain, rope or cable to be bound directly into the hem tube as the hem is being made, these machines are not adequate for making good quality hem cords because the hem tubes constructed therewith are characteristically too loose on the semi-rigid rod, allowing it to slip around more than is desirable.

Thus, it appears a need exists for a safe and reliable seam welder able to construct lap, fin and hem welds, as well as taped reinforcements, taped butt-welded joints, sleeves, tubes, hem cords and, flaps, while being minimally limited in the thickness of material it can weld. And, complexity and imprecision in switching among these different weld-types should be minimized, as well. Further, an ideal welder would be able to perform lap and taped butt-welds without limitations on the width of either sheet being welded. Yet further, accurate wedge centering to assure uniform heating of the sheets being welded would be desirable, as would precise speed control to assure that the weld is consistent along its length. And, means for producing a tight, continuous, unlimited-length hem cord would also be provided.

SUMMARY OF THE INVENTION

The seam welder of the present invention is adapted to overcome the above-noted shortcomings and to fulfill the stated needs. It is comprised of a chassis having an upstream end and an opposing downstream end; means for moving weldable sheet material therethrough; open-sided infeed guides for feeding first and second sheets of unlimited width into the welder in first and second planes, respectively; means downstream from the guides for welding overlapping portions of the sheets to one another, wherein the welding means includes opposed first and second welding surfaces and opposed first and second ends, and wherein the welding means is suspended by its first end from suspension connected to the chassis; means for guiding the first and second sheet portions past the first and second welding surfaces, respectively, of the welding means; and, means downstream from the welding means for bringing opposed surfaces of the first and second sheet portions into contact with one another.

Further included are means for accurate centering of the welding means with respect to the means for bringing the sheets' opposed surfaces into contact with one another.

Yet further included are means for producing a hem cord, comprising all of the elements of the seam welder, above, and further comprising: a horn upstream from the hot wedge; a guide; and, means downstream from the guide for bringing opposed surfaces of sheet material traveling above and below the horn into contact with one another. The upstream horn covers the upstream end, the top and bottom faces, and the first side face of the hot edge, yet leaves a second side face of the hot wedge exposed face of the hot wedge, and comprises: a wall opposing the exposed face of the hot wedge; a lower panel projecting parallel to, and residing a short distance below, the bottom face of the horn; and, an upper panel projecting parallel to, and residing a short distance above, the top face of the horn. Thus, when a length of cord in upstream to downstream orientation is laid against the hot wedge's exposed face, and an integral piece of weldable sheet material is folded to lie, at once, between the horn's bottom face and the lower guide panel therebelow, between the horn's top face and the upper guide panel thereabove, and between the cord and the opposing wall of the guide such that the opposing wall presses the cord against the hot wedge's exposed side face, the piece of weldable sheet material and the cord pass the hot wedge and, downstream from the hot wedge, result in the cord being bound into a tight channel formed in the sheet material.

Thus, it is an object of the present invention to provide a seam welder which is versatile in the types of welds it can perform, and unlimited in the sizes of the sheets it can join together.

It is a further object of the present invention to provide a seam welder which is exceedingly easy to use and able to produce accurate, consistent results along the length of the weld, as well as from one weld to the next.

Yet another object of the invention is to provide a hot wedge seam welder which is exceedingly safe to use, such that its hot wedge is shielded from operator contact when in its engaged, working position, as well as in its retracted, idle position. And, an additional object of the invention is to provide a hot wedge seam welder able to produce hem welds with ropes of cables therein, and also able to produce tight hem cord welds wherein the cord does not slip around inside the hem.

Still further objects of the inventive seam welder disclosed herein will be apparent from the drawings and following detailed description thereof.

BRIEF DESCRIPTION OF THE DRAWINGS

FIG. 28 is an elevational view, looking upstream, of the alternative hem cord apparatus of FIG. 27.

FIG. 29 is a perspective view of a completed hem cord weld.

DESCRIPTION OF THE PREFERRED EMBODIMENT

Figure 1:
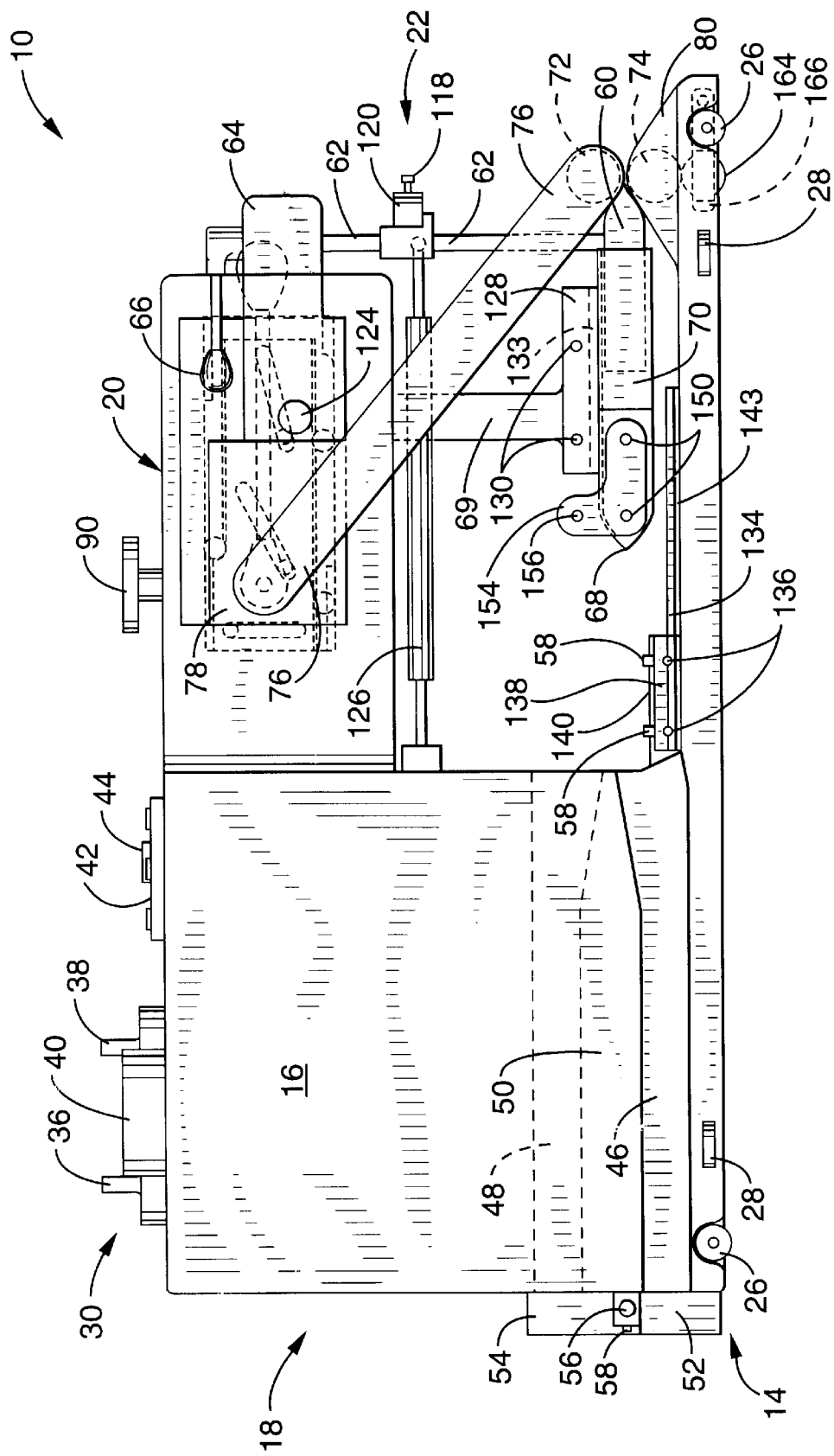
FIG. 1 is a right front perspective view of the seam welder of the invention.
Figure 2:
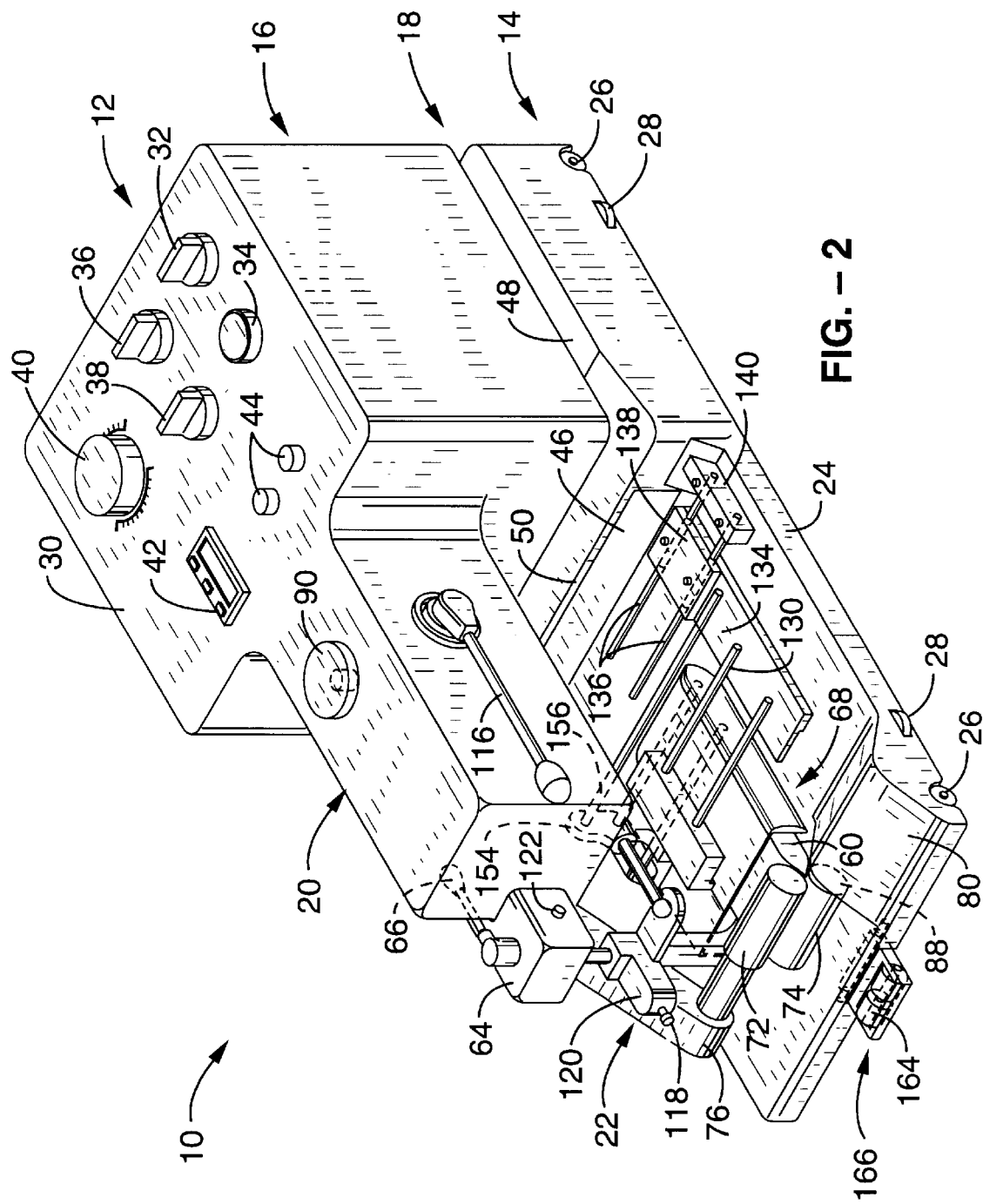
FIG. 2 is a rear left perspective view of the seam welder of FIG. 1, showing its edge guides, horn, welding head (hot wedge) and pressure rollers.

Referring now specifically to the drawings, FIGS. 1 and 2 show the inventive seam welder, which is generally identified herein with the reference numeral 10. Seam welder 10, in its gross configuration, is comprised of a chassis 12, with drive and welding elements supported thereupon.

Chassis 12 includes lower base portion 14; upper motor housing portion 16; S-shaped infeed portion 18 therebetween; and, projecting support arm portion 20. An outfeed portion 22 of welder 10 including drive and welding elements is disposed in the space between support arm portion 20's distal end and base portion 14.

Infeed portion 18 and outfeed portion 22 are oriented at the upstream and downstream ends, respectively, of welder 10. Support arm 20 projects in a downstream projection from motor housing portion 16 in the upper portion of chassis 12.

Base portion 14 includes base plate 24, wheels 26 and side bearings 28, as well as other elements described herein below.

Motor housing 16 is generally rectangular in configuration, and its upper surface includes control panel 30. Control panel 30 includes on/off switch 32; power indicator light 34; manual/auto switch 36; forward/reverse switch 38; speed control switch 40; programmable temperature control 42; and, fuses 44.

Figure 3:
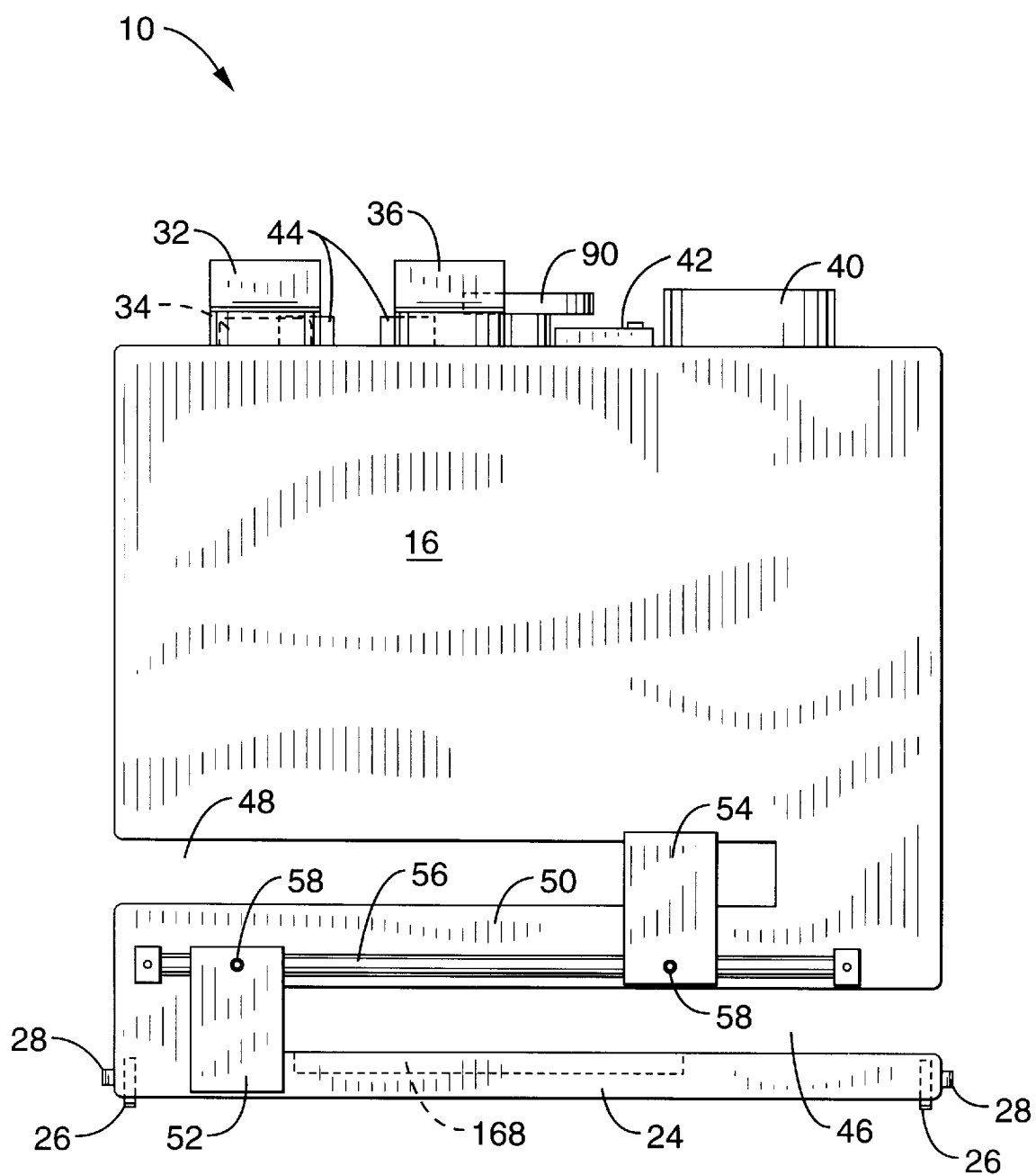
FIG. 3 is a front elevation of the welder of FIG. 1, showing its infeed slots, divider plate and sliding guides.

FIG. 3 shows that S-shaped infeed portion 18 includes lower right slot 46 and upper left slot 48, with rigid divider plate 50 therebetween. Right slot 46 is open on the right side of welder 10, as welder 10 is viewed from its upstream side as in FIG. 3, and left slot 48 is open on welder 10's left side. Lower right slot 46 is closed on its left side, and upper left slot 48 is closed on its right side.

The right and left directional orientations established with respect to right and left slots 46 and 48 will be carried through the remainder of the following disclosure in describing the locations and orientations of welder 10's other elements. That is, right and left are determined from an upstream position, looking in a downstream direction.

Plate 50 is contiguous, on its left side, with lower right slot 46's closed end, therebelow; and, plate 50 is contiguous, on its right side, with upper left slot 48's closed end, thereabove. Plate 50 is somewhat thicker at its upstream end than at its downstream end, for a reason to be discussed further herein below.

Right and left slots 46 and 48 have right and left slot sliding guides 52 and 54, respectively, which are both disposed on guide support rail 56. Rail 56 is in the plane of divider plate 50. Slot guides 52 and 54 include guide lock screws 58 which permit them to be fixed at any position in their travel along guide support rail 56. Slot guides 52 and 54 may be placed to limit the inner extent, and thereby the effective width, of slots 46 and 48 with reference to the sides of chassis 12, but slot guides 52 and 54 are not intended to define the outer width limits of these slots.

Downstream from infeed portion 18, and beneath support arm 20, are the welding elements of welder 10. The primary welding element, or welding head, is hot wedge 60 which is machined from aluminum to be elongate with a generally triangular cross-section. Wedge 60 includes one or more heating elements therewithin, powered via flexible electrical leads (not shown) connected to welder 10's power supply. Wedge 60 has the apex of its triangular cross-section oriented downstream, and is supported from its right-hand side by suspension which includes vertical shaft 62 mounted in, and passing through, wedge support housing 64. Atop wedge support housing 64, the upper end of vertical shaft 62 is fitted with wedge engaging handle 66, appropriate support bearings being provided between housing 64 and shaft 62. Wedge engaging handle 66 swings through a horizontal arc, and as it does, hot wedge 60 does the same at shaft 62's lower end.

Immediately upstream from hot wedge 60 is a hollow, protective shroud commonly referred to as a "horn." Horn 68 is generally wedge-shaped, having its apex oriented in an upstream direction. Horn 68 is suspended from its right side on the lower end of shroud support leg 69, which is comprised of a rigid vertical member upstream of vertical shaft 62, depending from hot wedge support housing 64. Horn 68's right side opens into hollow, generally rectangular, hot wedge parking shroud 70, which is also mounted on the lower end of shroud support leg 69.

At one extent of its horizontal arc, when wedge engaging handle 66 is thrown toward a position where it is aligned with welder 10's upstream/downstream axis as in FIG. 1, hot wedge 60 is in its engaged position wherein its length, and so its apex, are generally perpendicular to welder 10's upstream/downstream axis. At the other extent of its horizontal arc, when wedge engaging handle 66 is thrown toward its downstream-most position, hot wedge 60 is drawn toward the right side of welder 10, through horn 68 and into parking shroud 70, where wedge 60 rests in its disengaged position with its length aligned with welder 10's upstream/downstream axis.

Figure 4:
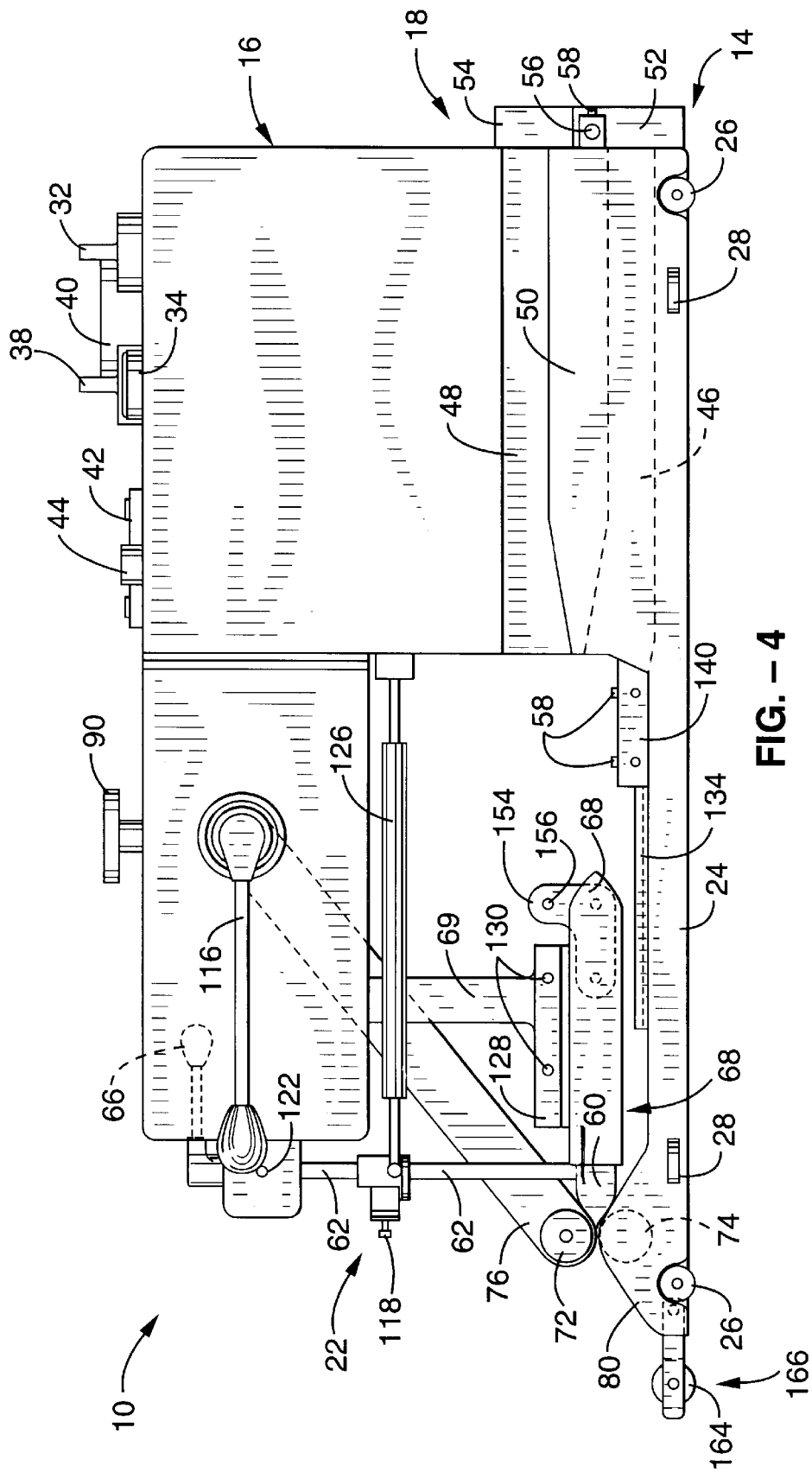
FIG. 4 is a left side elevation of the outfeed portion of the welder, showing the orientation of the hot wedge in its engaged position against the upstream side of the top and bottom pressure rollers.
Figure 5:
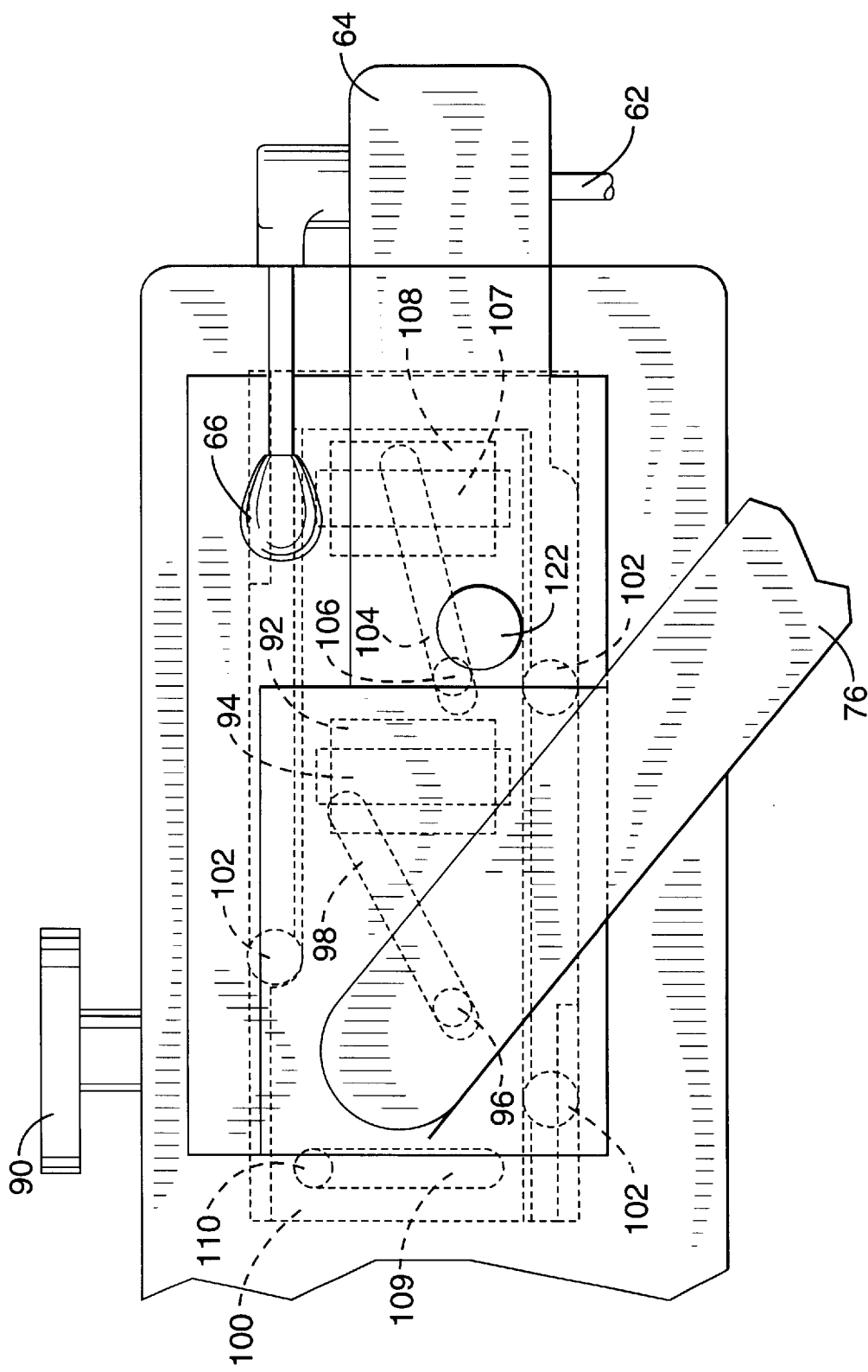
FIG. 5 is a partly disassembled perspective view from the top right downstream side of the welder's support arm, with its cover off, showing the upper roller housing and the hot wedge support housing, as well as their respective sliders, and their positions with reference to the cam plate.
Figure 6:
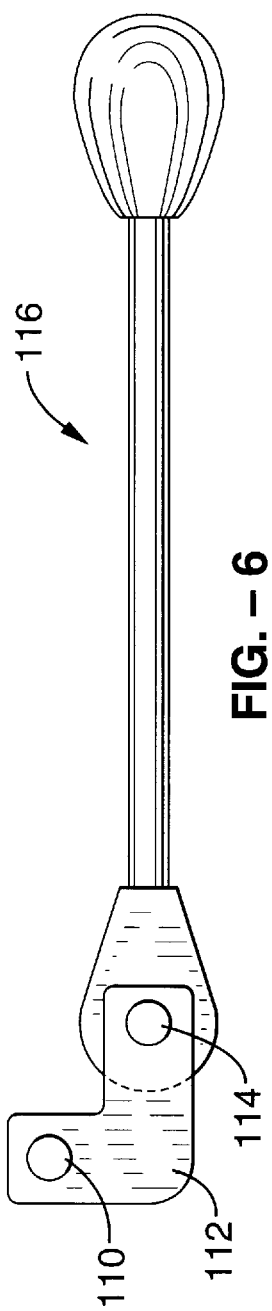
FIG. 6 is a side elevation of the drop handle which raises and lowers the hot wedge and upper pressure roller.
Figure 7:
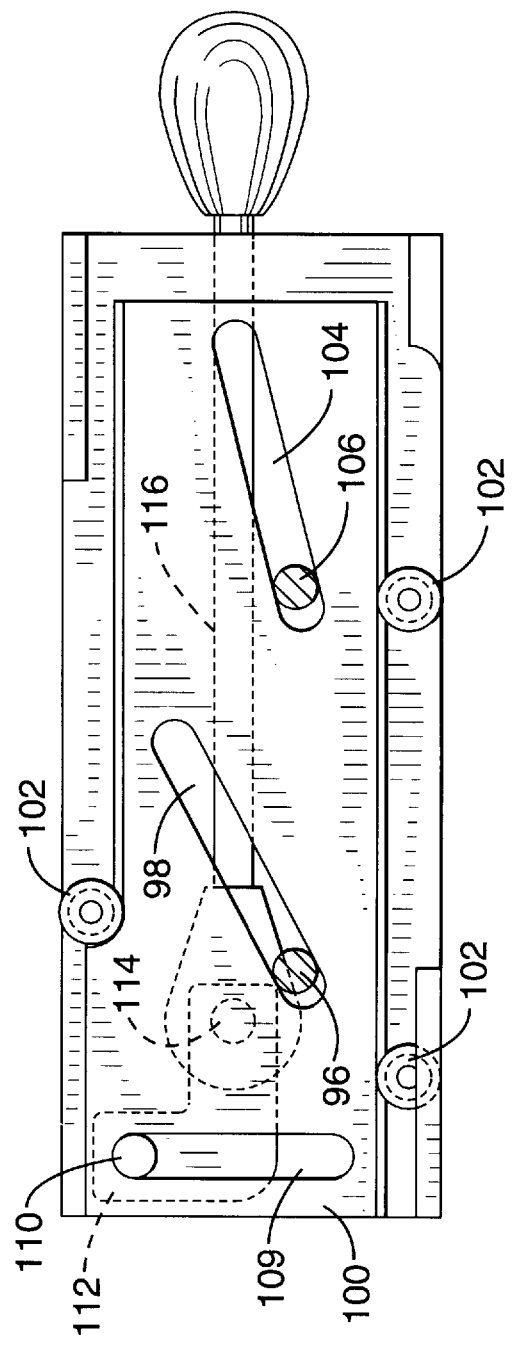
FIG. 7 is a partly disassembled, isolated perspective view from the top right downstream side of the welder, of the cam plate and its mounting for sliding motion.

As shown in FIGS. 2, 4 and 5, directly downstream from hot wedge 60's engaged position are upper and lower pressure rollers 72 and 74, respectively. Rollers 72 and 74 are of a dense, resilient construction, and rotate on spindles oriented on parallel, horizontal axes. Upper pressure roller 72 is suspended from the right and projects perpendicularly from the lower end of upper roller drive chain conduit 76 which, in turn, is elongate and angularly disposed, and has its upper terminus at upper roller drive housing 78 upstream of hot wedge support housing 64. Upper roller drive chain conduit 76 covers a drive chain (not shown).

Lower roller 74 projects from the left, from lower roller drive shaft channel 80. Lower roller 74 is driven by a drive shaft (not shown), which is powered by sprocket, shaft and chain elements (not shown) running in channels through the upstream edge of divider plate 50 and along the left side of base plate 24.

Upper and lower rollers 72 and 74 are driven at the same rotational speed by chain and sprocket links to an electric motor (not shown) within motor housing 16.

The free, right-hand end face 82 of lower roller 74 resides in the same plane as the inner, right-hand, drive side face 84 of upper roller 72. Likewise, the free, left-hand end face 86 of upper roller 72 resides in the same plane as the inner, left-hand, drive side face 88 of lower roller 74.

The pressure exerted by upper roller 72 against lower roller 74 can be adjusted by rotation of knurled upper roller pressure adjustment knob 90. A vertically oriented coil spring therebeneath (not shown) exerts pressure between the upper inside of support arm 20 and a slider 92 with which upper roller drive housing 78 is engaged.

Upper roller housing slider 92, shown in FIG. 5, is mounted for bearing-aided, reciprocal, vertical movement on vertical track 94. Upper roller drive housing 78 has a projecting cylindrical cam follower 96 on its left side, which engages an approximately 28° angled slot 98 in cam plate 100. Cam plate 100 is generally rectangular and is mounted on bearings 102 for low-friction, reciprocal, horizontal motion.

Cam plate 100 also includes an approximately 14° angled slot 104, which is downstream from 28° angled slot 96. Second cam follower 106 projects from the left side of hot wedge support housing 64 and engages 14° angled slot 98. Hot wedge support housing slider 108 is mounted for bearing-aided, reciprocal, vertical movement on vertical track 107.

Cam plate 98 also includes vertical slot 109 adjacent its upstream end. Slot 109 accommodates third cam follower 110 which is mounted on tab 112 eccentric to pivot shaft 114 of drop handle 116. Drop handle 116 is mounted to the outer left side of support arm 20.

When drop handle 116 is thrown into a vertical orientation, third cam follower 110 moves in an upstream direction and, consequently, toward the lower end of vertical slot 109. This causes cam plate 98 to be driven toward its upstream-most position; and, as that occurs, first and second cam followers 96 and 106, respectively, naturally rise higher in their respective angled slots, 98 and 104. Upward movement of first cam follower 96 causes upper roller housing slider 92, upper roller drive housing 78, upper roller drive chain conduit 76 and upper pressure roller 72 all to rise. Upward movement of second cam follower 106 causes hot wedge support housing slider 108, hot wedge support housing 64, wedge engaging handle 66, vertical shaft 62, hot wedge 60, shroud support leg 69, horn 68 and hot wedge parking shroud 70 all to rise, along with various auxiliary material guides further described below.

When drop handle 116 is released from the below-described detent at the upward extent of its travel and thrown downward, in a downstream direction, into a horizontal orientation as shown in FIG. 2, thereby driving cam plate 98 toward its downstream-most position, first and second cam followers 96 and 106, respectively, drop lower in their slots, and all of the elements described herein above as being respectively associated therewith, drop down into their engaged, welding positions.

Owing to the approximately 28° angle of angled slot 98 and the approximately 149° angle of angled slot 104, the ratio of the vertical distance upper roller 72 moves to the vertical distance hot wedge 60 moves, with the passage of drop handle 116 through a given arc, is always 2:1. However, the particular angles disclosed as preferred are not critical to the function of welder 10; indeed, satisfactory function is expected to be achieved over a wide range of angles. But, it is important that the ratio of the angle of angled slot 98 to the angle of angled slot 104 always be 2:1. This causes upper pressure roller 72 always to travel twice the vertical distance traveled by wedge 60.

Upper roller drive housing 78 rises against the resistance force of the vertically oriented coil spring (not shown) associated with upper roller pressure adjustment knob 90. However, third cam follower 110 on lobe 112 of drop handle 116 is positioned a sufficient distance from pivot shaft 114's axis, and vertical slot 109's terminus is sufficiently low on cam plate 98, that when handle 116 is vertical, cam follower 110 is in an over-center position with respect to pivot shaft 114 and the force being applied by the vertical coil spring. Thus, a detent in the operation of drop handle 116 is provided in the "up" position. And, this detent permits all upper roller-associated elements, as well as all hot wedge-associated elements to rest securely in this up, disengaged position.

Hot wedge 60, when in its engaged position, is ideally aligned with respect to upper and lower rollers 72 and 74 such that wedge 60's length is parallel to the line along which the surfaces of rollers 72 and 74 occlude. This line of occlusion is generally perpendicular to welder 10's upstream/downstream axis, and is commonly referred to as the "nip" of the rollers. Wedge right end/left end adjustment screw 118, on alignment adjustment block 120, permits such parallel alignment of the wedge to the nip by moving the right end of hot wedge 60, where it is attached to the lower end of vertical shaft 62, slightly off-center in either an upstream or a downstream direction with respect to shaft 62's vertical axis, as desired. Thus, adjustment screw 118 permits selective movement of either the right end or the left end of wedge 60 upstream or downstream in the horizontal plane, so that either one end or the other is closer to, or farther away from, the nip.

Nip proximity adjustment screw 122 on wedge support housing 64 provides direct upstream and downstream adjustment of the entire length of wedge 60, permitting wedge 60 to be brought closer to, or farther away from, the nip of rollers 72 and 74, without altering wedge 60's parallel adjustment thereto.

And, wedge 60, when in its engaged position, is ideally positioned with respect to upper and lower rollers 72 and 74 such that wedge 60's apex is centered in the plane tangent to the surfaces of both rollers along the line where they occlude, i.e. neither above nor below the horizontal plane running through the nip. Wedge vertical adjustment screw 124, on the upstream, right side of wedge support housing 64 provides this.

Once properly adjusted, the 2:1 relationship between the movement distance of upper roller 72 and that of wedge 60 causes wedge 60 to be self-centering between rollers 72 and 74 for all positions of drop handle 116 throughout its arc. Thus, when drop handle 116 is in its up position and rollers 72 and 74 are separated, the space for inserting a sheet of weldable material between the upper face of wedge 60 and roller 72 is the same size as the space between the lower face of wedge 60 and roller 74. And, consequently, when drop handle 116 is lowered into its horizontal position, both sheets of material are pressed against wedge 60 with equal force, thus insuring equal heating and a uniform weld.

It is desirable that hot wedge 60, when placed in its engaged position, have force behind it in a downstream direction, pressing its apex into the nip of rollers 72 and 74, thus assuring good contact and effective heating of weldable material running thereover. It is also desirable that when hot wedge 60 is placed in its disengaged position, retracted into parking shroud 70, that it be positively retained therewithin. Gas cylinder 126 provides means for holding hot wedge 60 in both positions. Its upstream, cylinder end is pivotally mounted on the downstream side of motor housing 16, just under support arm 20. Cylinder 126's downstream, shaft end is pivotally mounted on wedge alignment adjustment block 120 such that when wedge 60 is thrown into its engaged position and adjustment block 120 is oriented downstream, cylinder 126 exerts the desired constant downstream force on wedge 60, pressing it into the nip of rollers 72 and 74. Further, gas cylinder 126's shaft end at adjustment block 120 is mounted in an over-center position, so that when hot wedge 60 is retracted into parking shroud 70, it is retained therein under a positive force.

Welder 10 is capable of performing a variety of welds, including the three primary types: lap, fin and hem welds; and, is further capable of producing several variations thereupon, including: taped reinforcements, taped butt-welded joints, sleeves, tubes, and, flaps. Precise seam construction requires that the weldable sheet material being used be very accurately positioned as it is fed into welder 10's upstream infeed slots 46 and 48, over and under horn 68 and wedge 60, and through pressure rollers 72 and 74. Thus, it is highly desirable that, especially when welder 10 is being used in its self-propelled "automatic" mode, one or more auxiliary guides be used to align the incoming sheet material and to hold it in the proper configuration as it is being drawn across the wedge and welded.

Figure 8:
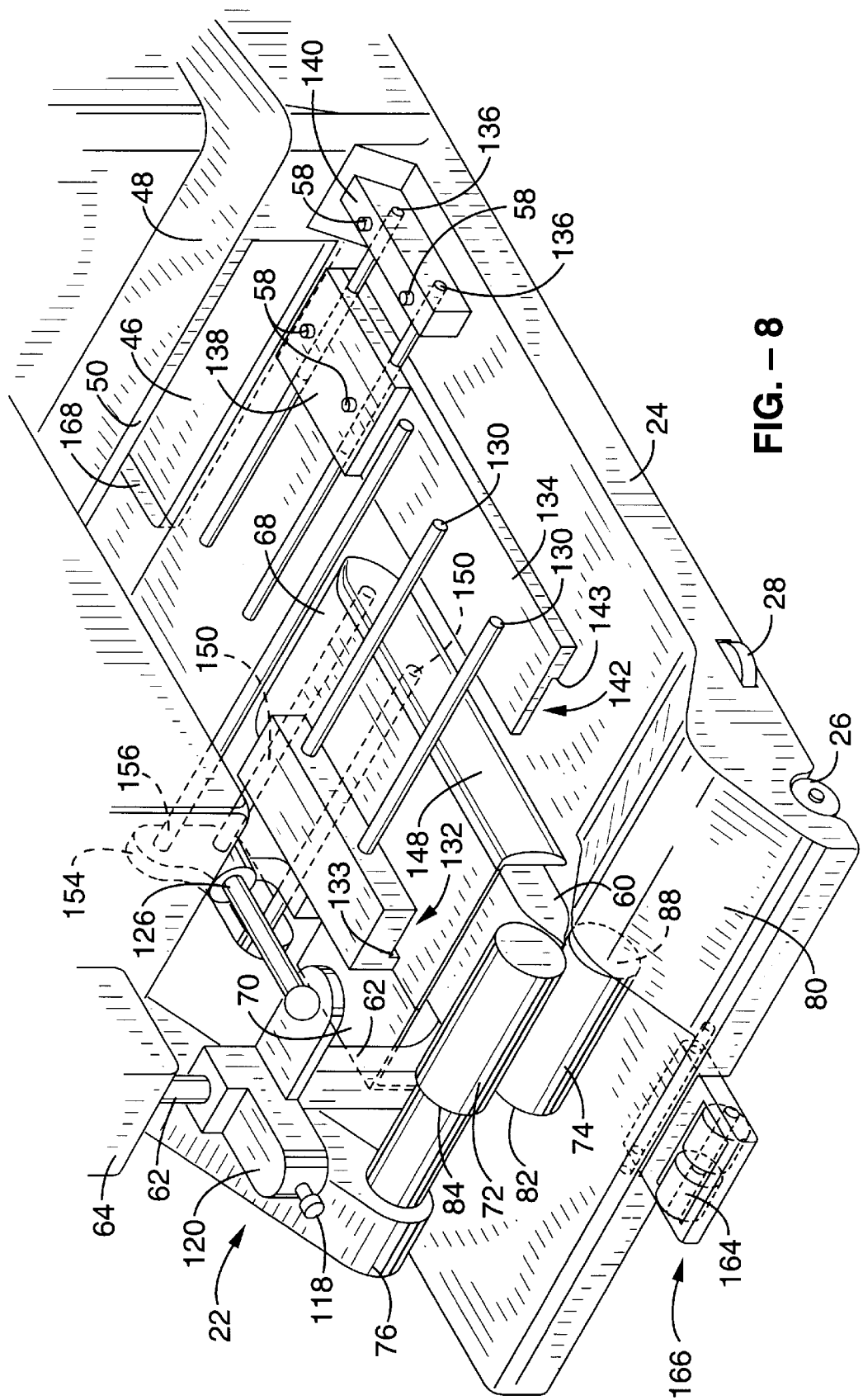
FIG. 8 is a partly disassembled perspective view from the top left downstream side of the outfeed portion of the welder, showing the top right edge auxiliary guide and the bottom left edge auxiliary guide in place for lap welding.
Figure 9:
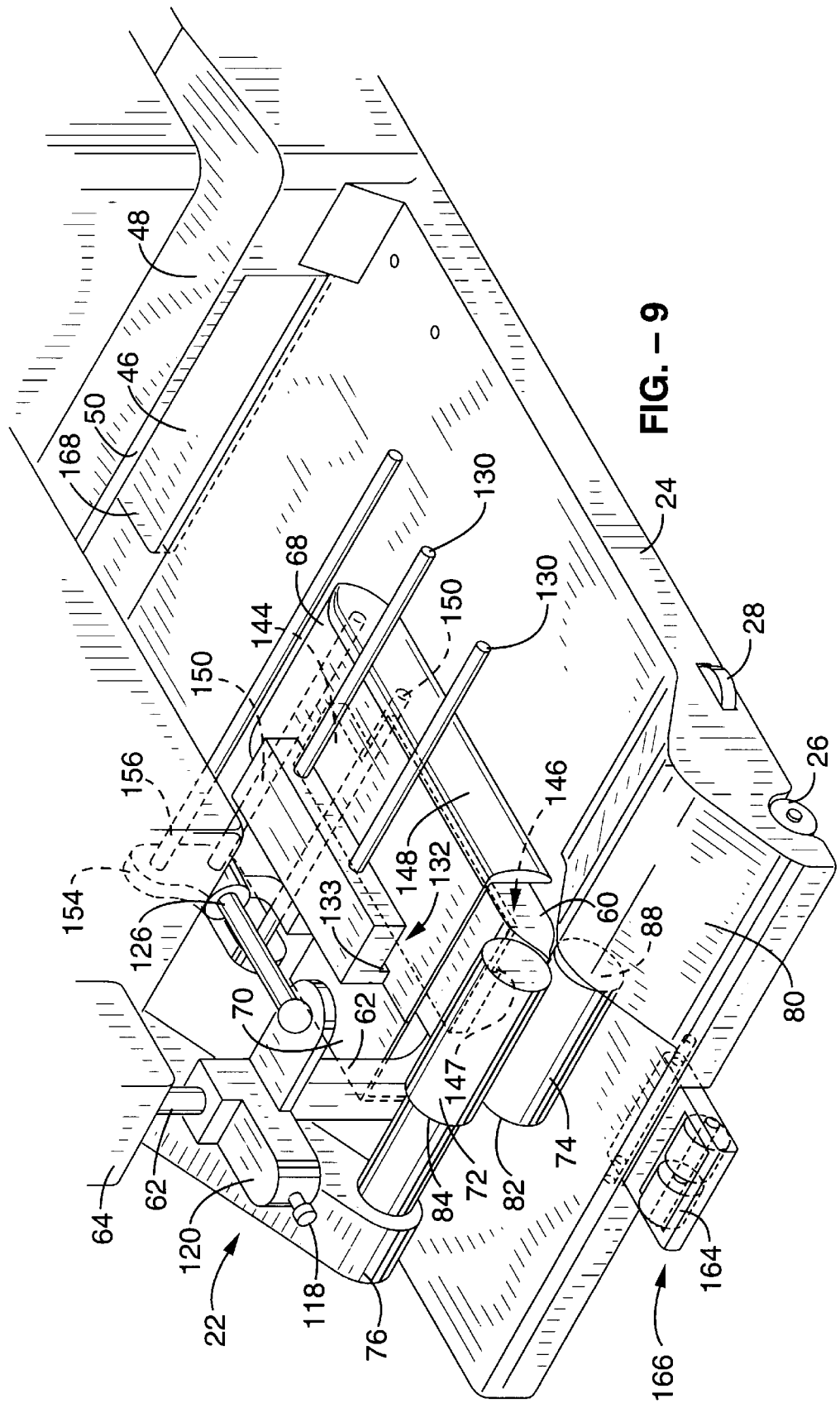
FIG. 9 is a perspective view similar to FIG. 8, showing the bottom right edge auxiliary guide replacing the bottom left edge auxiliary guide, as is required for fin welding.

Top right edge auxiliary guide 128 is elongate and generally rectangular, and resides just above horn 68. And, as shown in FIGS. 8 and 9, its length is oriented parallel to welder 10's upstream/downstream axis. Top right edge auxiliary guide 128 is supported by, and slides on, two top guide support rods 130. Top guide support rods 130 are horizontally oriented, and their right side ends are securely affixed to shroud support leg 69, just above horn 68. Top right edge auxiliary guide 128 is able to slide left and right on top guide support rods 130, and guide lock screws 58 permit guide 128 to be locked in any position therealong.

Top right edge auxiliary guide 128 includes a wide notch 132 along the entire length of its lower face. Notch 132 is open on the left, has a rightward travel-limiting wall 133 on the right which, when guide 128 is moved to its rightward-most limit, preferably aligns with the inner, right-hand, drive side face 84 of upper roller 72. The horizontal underface of notch 132's interior is sufficiently spaced from the upper surface of horn 68 to accommodate the thickest weldable sheet material for which welder 10 is intended to be used. Thus, notch 132 is adapted to receive and limit the rightward travel of the right edge of a weldable material sheet passing from upper left infeed slot 48 of welder 10's infeed portion 18, over horn 68 and hot wedge 60, and through rollers 72 and 74.

As shown in FIG. 8, bottom left edge auxiliary guide 134 is elongate and generally rectangular, and resides just below horn 68. Guide 134's length is oriented parallel to welder 10's upstream/downstream axis. Bottom left edge auxiliary guide 134 slides left and right on base plate 24, along bottom guide rods 136 extending through transverse, horizontal channels in a thickened, upstream portion 138 of guide 134. Guide 134 is able to be fixed in place with guide lock screw 58 which bears against base plate 24. Bottom guide rods 136 are horizontally oriented and securely affixed at their right side ends to removable tab 140 which projects upward from base plate 24 just downstream of, and just left of the left-most terminus of, lower right infeed slot 46. Guide lock screws 58 engage threaded holes in base plate 24 to fix tab 140 in place, when desired.

Bottom left edge auxiliary guide 134 includes a wide notch 142 along the entire length of its lower face. Notch 142 is open on the right and has a leftward travel-limiting wall 143 on the left. The horizontal underface of notch 142's interior is sufficiently spaced from base plate 24 to accommodate the thickest weldable sheet material for which welder 10 is intended to be used. Thus, notch 142 is adapted to receive and limit the leftward travel of the left edge of a weldable material sheet passing from lower right infeed slot 46 of welder 10's infeed portion 18, under horn 68 and hot wedge 60, and through rollers 72 and 74.

FIG. 9, in comparison with FIG. 8, shows bottom left edge auxiliary guide 134 removed and replaced with bottom right edge auxiliary guide 144. Bottom right edge auxiliary guide 144 is generally rectangular in configuration and seats on base plate 24 beneath, and to the right of, hot wedge 60 and horn 68. Guide 144 is not mounted on support rods for sliding adjustment; it is simply adapted to be fastened in a stationary position to base plate 24 with guide lock screw 58.

Guide 144 includes a wide notch 146 along the entire length of its lower face. Notch 146 is open on the left and has a rightward travel-limiting wall 147 on the right. The horizontal underface of notch 146's interior is sufficiently spaced from base plate 24 to accommodate the thickest weldable sheet material for which welder 10 is intended to be used. Thus, notch 146 is adapted to receive and limit the rightward travel of the right edge of a weldable material sheet passing from upper left infeed slot 48 of welder 10's infeed portion 18, under horn 68 and hot wedge 60, and through rollers 72 and 74.

Figure 10:
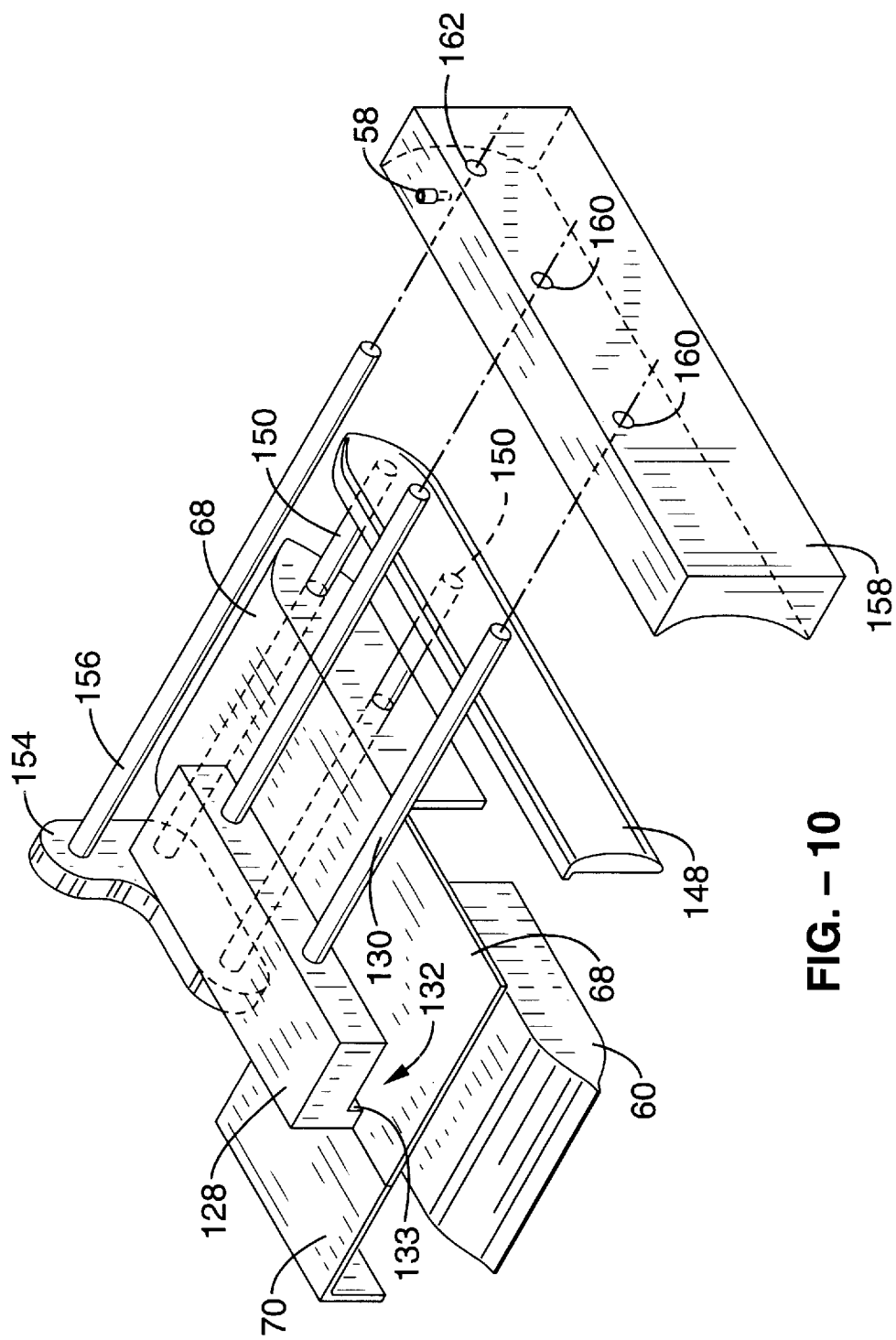
FIG. 10 is a partly disassembled perspective view from the top left downstream side of the outfeed portion of the welder, showing the hem width extender and outer hem guide for hem welding.

Referring now to FIG. 10, horn width extender 148 is comprised of a panel nested against the left face of horn 68, and is extendable to the left on horn width extender support rods 150 to increase horn 68's effective width. Horn width extender 148, when viewed in its side elevation, is shaped to match the side elevation of horn 68; thus, they have generally the same shape in longitudinal cross-section. Horn width extender 148 also preferably has a slightly convex left face.

Horn width extender support rods 150 are horizontally oriented and disposed perpendicular to welder 10's upstream/downstream axis, their left ends being securely bound to the right face of horn width extender 148. Support rods 150 pass slidingly through transverse, horizontal channels in partial side skirt 152 depending from the upstream two-thirds of the left side of horn 68. The right ends of horn width extender support rods 150 are securely bound to the left face of triangular push/pull tab 154, which is disposed to the right of horn 68. Moving push/pull tab 154 to the rightward-most limit of its travel causes horn width extender 148 to rest flush against side skirt 152. Moving push/pull tab 154 leftward causes horn width extender 148 to move a corresponding distance to the left, with tab 154 acting as a stop when it abuts horn 68's right side.

A third rod projecting from the left face of push/pull tab 154 is outer hem guide control rod 156. Outer hem guide control rod 156 is securely bound at its right end to the upper apex of push/pull tab 154, and is oriented parallel to the two lower-situated horn width extender support rods 150. Further, control rod 156 is disposed in the same horizontal plane as, and somewhat upstream of, top guide support rods 130.

The left end of outer hem guide control rod 156 is intended and adapted for selective attachment to auxiliary outer hem guide 158, which is an elongate bar of approximately the same upstream/downstream length as horn 68. Outer hem guide 158 is generally rectangular in transverse cross-section, but the lower portion of its right face is preferably slightly concave and complementary to the convex left face of horn width extender 148. Three transverse, horizontal channels are disposed along the length of outer hem guide 158, and nearer its upper side, i.e. above its horizontal centerline. The two downstream-most channels 160 are spaced and positioned for sliding receipt of top guide support rods 130. The upstream-most channel 162 is for receipt of the left end of outer hem guide control rod 156, and a guide lock screw 58 is provided above that channel for securing outer hem guide 158 at any point desired along rod 156. Once outer hem guide 158 is secured to rod 156 a fixed distance from horn width extender 148, supported on top guide support rods 130, left or right movement of push/pull tab 154 causes corresponding movement in both horn width extender 148 and outer hem guide 158, without changing the fixed distance between extender 148 and guide 158.

Drive motion for linear translocation of welder 10 and for automatic welding is provided by drive rollers 164 suspended on the end of swing arm 166 which is, in turn, pivotally mounted central to the downstream edge of base plate 24. As shown in FIG. 4, when swing arm 166 is retracted beneath base plate 24, drive rollers 164 are in contact with lower pressure roller 74 and rotational motion is transmitted thereto, pushing welder 10 along in an upstream direction. As drive rollers 164 are of a diameter which also puts them in contact with the supporting surface beneath wheels 26, the rotational motion transmitted from roller 74 effects linear motion of welder 10. Swing arm 166 may alternatively be pivoted to a disengaged position downstream of the rear edge of base plate 24, placing drive rollers 164 out of contact with pressure roller 74 as shown in FIG. 2. In this mode, linear translocation of welder 10 may only be effected by the powered feed of weldable material through rollers 72 and 74, providing such material is otherwise held stationary against movement in relation to the underlying surface.

In use, for example in performing a lap weld, welder 10 is prepared by putting bottom left edge auxiliary guide 134 in place below horn 68. Then, right and left slot sliding infeed guides 52 and 54 are adjusted for the appropriate overlap to achieve the width of weld desired, and top right edge and bottom left edge auxiliary guides 128 and 134 are adjusted for the same amount of overlap. Next, with drop handle 116 in its up position, a first sheet of weldable material 210 is fed into lower right infeed slot 46 and a second sheet 212 is fed into upper left infeed slot 48. Lower sheet 210 is threaded below horn 68, with its left edge against bottom left edge auxiliary guide 134's leftward travel-limiting wall 143, across the lower face of wedge 60 and between rollers 72 and 74. Upper sheet 212 is threaded over horn 68 with its right edge against top right edge auxiliary guide 128's rightward travel-limiting wall 133, across the upper face of wedge 60 and over first sheet 210 between rollers 72 and 74. Then, after lowering drop handle 116 to press upper roller 72 downward against sheets 210 and 212 upon lower roller 74, the downward pressure exerted by upper roller 72 may be set by manipulation of upper roller pressure adjustment knob 90. Welding may then proceed in either manual or automatic fashion, while adjusting material feed speed, wedge temperature, roller pressure and other welding parameters with the appropriate controls on control panel 30, as is known in the art, and while engaging or disengaging wedge 60, as necessary.

Figure 11:
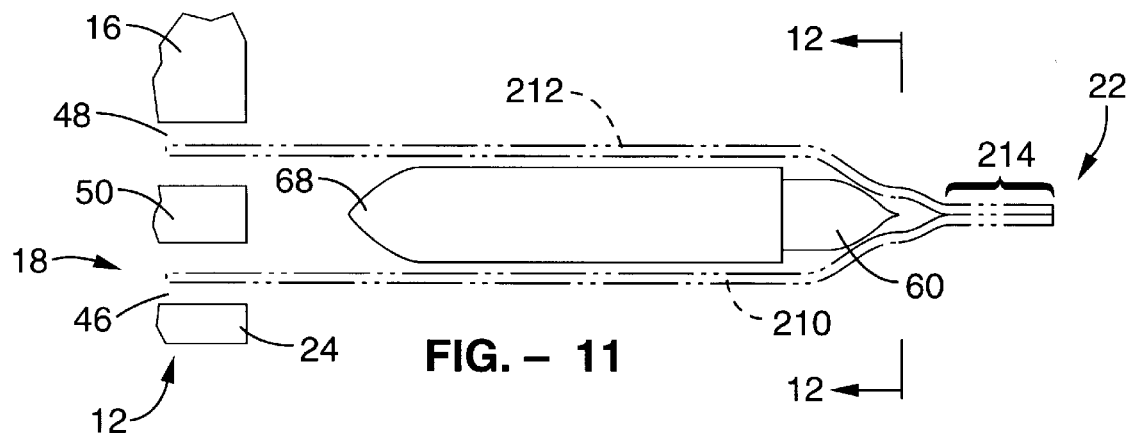
FIG. 11 is a schematic representation, from the right-hand side, of a longitudinal cross-section of a lap weld during its formation.
Figure 12:
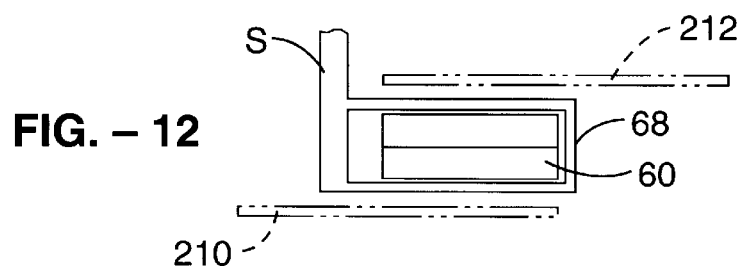
FIG. 12 is a transverse cross-sectional view from downstream, on lines 12—12, of formation of the lap weld of FIG. 11.
Figure 13:
FIG. 13 is a schematic cross-section of a completed lap weld.

A schematic longitudinal cross-section of the afore-described lap weld during its formation is presented in FIG. 11; a corresponding transverse cross-sectional view from downstream is presented in FIG. 12; and, a schematic cross-section of the completed lap weld 214 is shown in FIG. 13. The conventions of using "S" to identify a schematic representation of a combined support for the wedge and shrouds, and a bracket to identify a welded area, are employed throughout the drawing figures.

Figure 14:
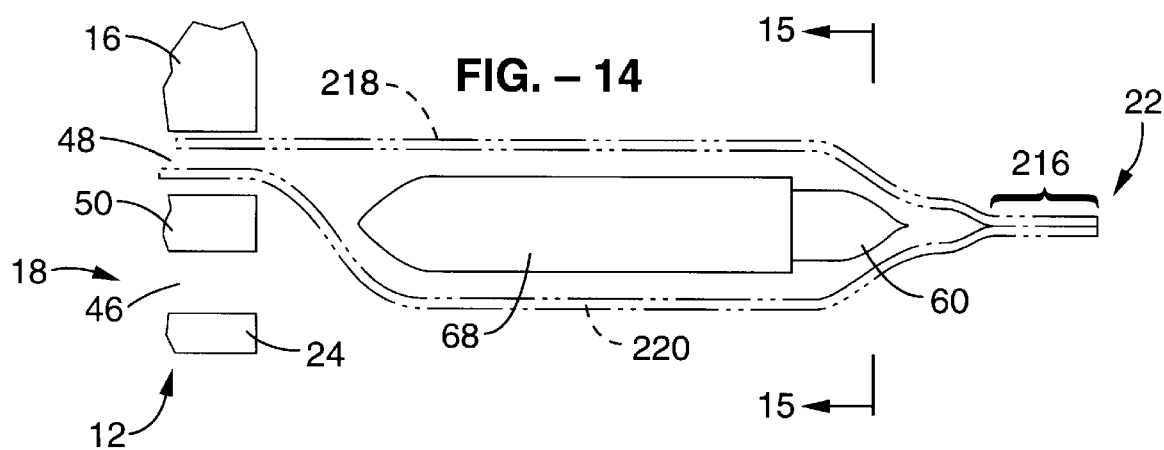
FIG. 14 is a schematic representation, from the right-hand side, of a longitudinal cross-section of a fin weld during its formation.
Figure 15:
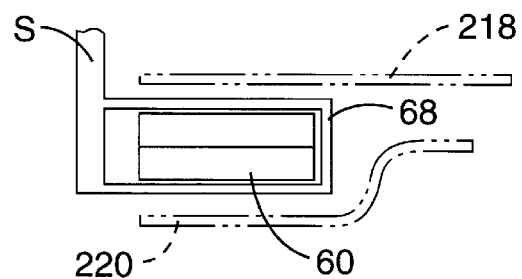
FIG. 15 is a transverse cross-sectional view from downstream, on lines 15—15, of formation of the fin weld of FIG. 14.
Figure 16:
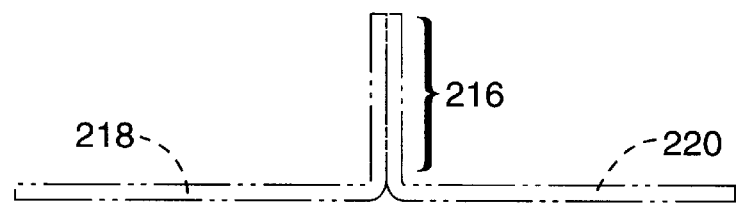
FIG. 16 is a schematic cross-section of a completed fin weld.

FIGS. 14, 15 and 16, respectively, show a schematic longitudinal cross-section of, a transverse cross-section of, and a representation of a completed, fin weld 216. Welder 10 is prepared for performing a fin weld by first putting bottom right edge auxiliary guide 144 in place below horn 68. Fin weld 216 is then formed by feeding lower and upper sheets 218 and 220 together, and in stacked relation, into upper left infeed slot 48 with their right edges aligned with one another against left sliding infeed guide 54. Sheets 218 and 220 separate at the upstream end of horn 68, upper sheet 218 going above, lower sheet 220 going below. Lower sheet 218's right edge is against rightward travel-limiting wall 147 of bottom right edge auxiliary guide 144. Upper sheet 220's right edge is against top right edge auxiliary guide 128's rightward travel-limiting wall 133. Lower sheet 218 is threaded from below horn 68, across the lower face of wedge 60 and between rollers 72 and 74. Upper sheet 220 is threaded across the upper face of wedge 60 and is pressed down upon lower sheet 218 between rollers 72 and 74.

Figure 19:
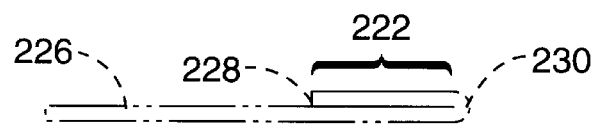
FIG. 19 is a schematic cross-section of a completed hem weld.
Figure 17:
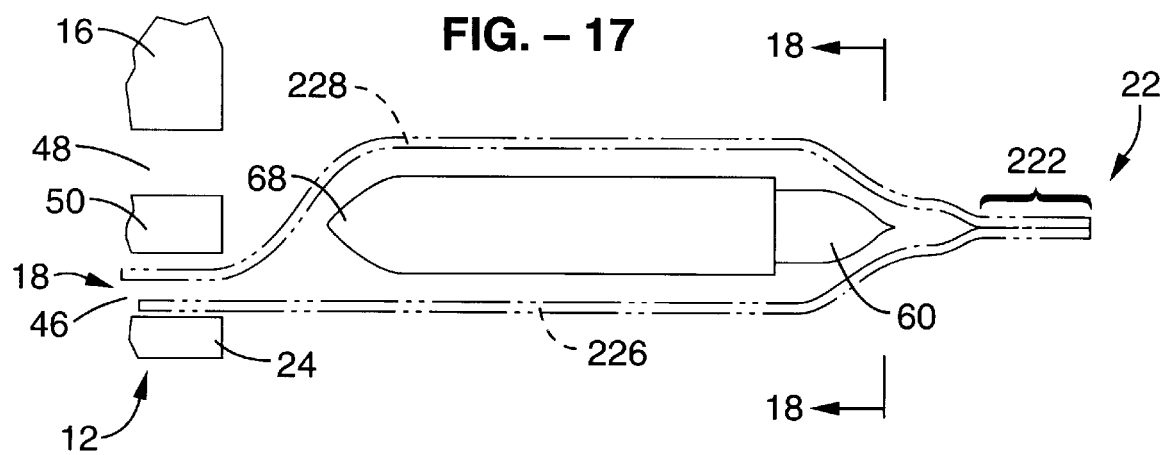
FIG. 17 is a schematic representation, from the right-hand side, of a longitudinal cross-section of a hem weld during its formation.
Figure 18:
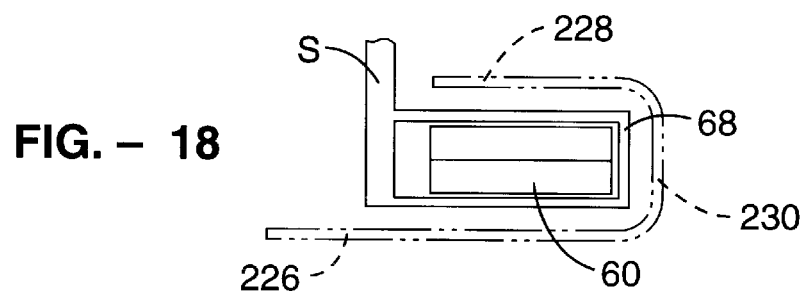
FIG. 18 is a transverse cross-sectional view from downstream, on lines 18—18, of formation of the hem weld of FIG. 17.

FIGS. 17, 18 and 19, respectively, show a schematic longitudinal cross-section of, a transverse cross-section of, and a representation of a completed, hem weld 222. Welder 10 is prepared for performing hem weld 222 by first sliding outer hem guide 158 onto top guide support rods 130 and outer hem guide control rod 156. Guide lock screw 58 above upstream transverse channel 162 in outer hem guide 158 may be used to bind outer hem guide 158 to control rod 156 at a fixed distance from horn width extender 148. Thereafter, horn width extender 148 and outer hem guide 158 move together as a unit, maintaining the space fixed therebetween, in response to movement of push/pull tab 154. The width of the hem is set by moving push/pull tab 154 leftward to position horn width extender 148 and outer hem guide 158 a desired distance from horn 68. This assembly may be locked in position with a guide lock screw (not shown) bearing on one of the horn width extender support rods 150 where they pass through horn 68 or skirt 152. Top right edge auxiliary guide 128 is set in its rightward-most position. No auxiliary guide is used beneath horn 68.

Hem weld 222 is then formed by folding an outer edge 224 of a single sheet of weldable material over on itself so that a primary sheet portion 226 and a hem portion 228 are thereby defined. This folded single sheet is then fed into lower right infeed slot 46 such that, as it progresses downstream, primary sheet portion 226 passes beneath horn 68, and hem portion 228 passes thereover. As is illustrated best in FIG. 17, primary sheet portion 226 curves up from beneath horn 68, and between horn width extender 148 and outer hem guide 158, such that upper hem portion 228 lies relatively flat atop horn 68 with outer edge 224 against top right edge auxiliary guide 128's rightward travel-limiting wall 133. Moving downstream, lower primary sheet portion 226 moves across the lower face of hot wedge 60 and between rollers 72 and 74. Hem portion 228 moves across the upper face of wedge 60, and is pressed down on lower primary sheet 226 between rollers 72 and 74. As illustrated in FIG. 19, an nonwelded fabric portion 230 remains to the left of the welded portion of hem weld 222.

Figure 20:
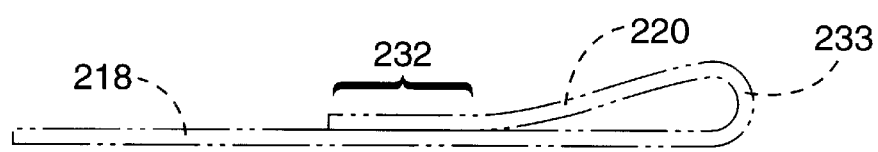
FIG. 20 is a schematic cross-section of a completed sleeve weld.

A variation on fin weld 216 is sleeve weld 232 shown in FIG. 20. Sleeve weld 232 is accomplished by simply folding a sheet of material such that lower sheet 218 and upper sheet 220 of fin weld 216 are simply opposed edges of the same sheet. This leaves a nonwelded loop portion 233.

Figure 21:
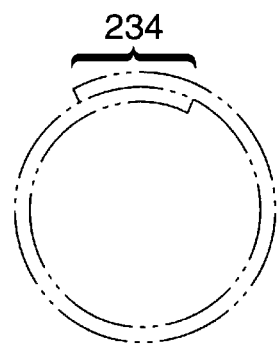
FIG. 21 is a schematic cross-section of a completed tube weld.
Figure 22:
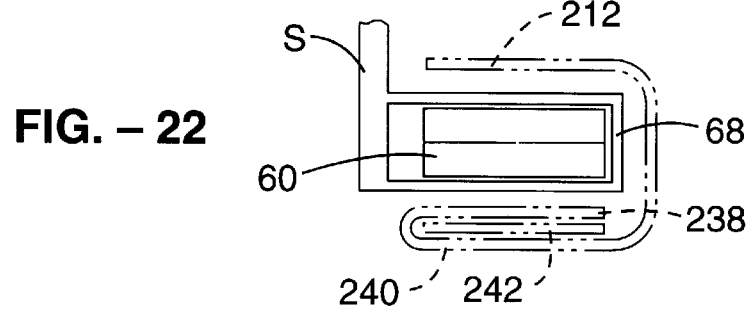
FIG. 22 is a transverse cross-sectional view, from downstream, of formation of a tube weld.

A variation on a lap weld 214 is tube weld 234 shown in FIG. 21. Tube weld 234 is achieved by eliminating the lower right sheet of lap weld 214, and by instead folding the fabric sheet 212 that is fed into upper left infeed slot 46 so that a doubled portion 236 thereof runs beneath horn 68 and wedge 60 as illustrated in FIG. 22. Sleeve 234 may be created without using any auxiliary guide beneath horn 68, and just using left slot sliding infeed guide 54 to align doubled portion 236. However, the preferred approach is to employ a modified version of bottom right edge auxiliary guide 144 with a notch 146 in its underface able to accommodate the thickness of doubled sheet portion 236. Control of the temperature of hot wedge 60 is more sensitive in creating sleeve weld 234, because welding the upper and lower segments 238 and 240 of doubled portion 236 beneath wedge 60 to one another is to be avoided. A later-removable strip of insulating material 242 may be used between upper and lower segments 238 and 240 to reduce this likelihood.

Figure 23:
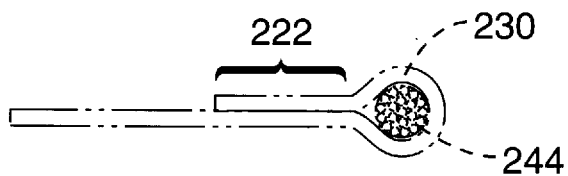
FIG. 23 is a schematic cross-section of a completed hem weld with a chain, rope or cable in the channel running therethrough.

As shown in FIG. 23, a variation on hem weld 222 includes a thick tether such as chain, rope or cable 244 running through the length of the hem's interior. This requires accommodation of increased cross-sectional thickness where the hem's channel passes through welder 10. Such is provided by chain channel 168 in base plate 24, in the leftward-most half of lower right infeed slot 46.

Figure 24:
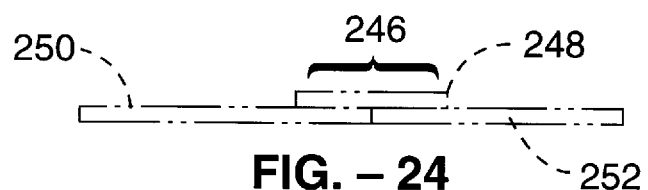
FIG. 24 is a schematic cross-section of a completed taped butt weld.

Taped butt welds 246 are a variation of lap weld 214. As shown in FIG. 24, a narrow tape strip 248 of weldable material is welded to the upper surfaces of abutting right and left sheets 250 and 252, thereby binding them together. This is accomplished by feeding right sheet 250 into lower right infeed slot 46 and left sheet 252 into upper left infeed slot 48, and by passing both sheets 250 and 252 beneath horn 68. No auxiliary guide is used beneath horn 68; the opposed edges of the sheets are simply abutted together. The left edge of right sheet 250 is against right sliding infeed guide 52, but the right edge of left sheet 252 is set back from left sliding guide 54 a distance half the width of the tape strip 248. Although left sheet 252 does not contact any guide directly, the left edge of right sheet 250 serves as the guide for the right edge of left sheet 252. Tape strip 248 is fed in through upper left infeed slot 46 atop left sheet 252. Tape strip 248's right edge is against left sliding infeed guide 54 and top right edge auxiliary guide 128's rightward travel-limiting wall 133. Tape strip 248 passes across the upper face of hot wedge 60 and is pressed down between rollers 72 and 74 over the abutting opposed edges of right and left sheets 250 and 252.

Figure 25:
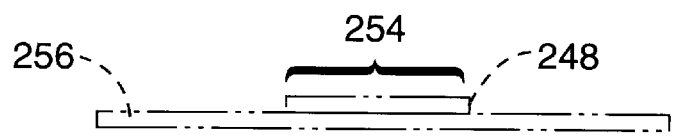
FIG. 25 is a schematic cross-section of a completed taped reinforcement weld.

Taped reinforcements 254 employ a tape strip 248 similar to that employed in constructing taped butt weld 246. However, as shown in FIG. 25, reinforcements 254 are simply doubled layers of material. Taped reinforcements 254 are useful, for example, where grommets will be installed, or in areas where a unusual amount of wear is expected. Several alternative procedures may be used for creating a taped reinforcement 254. For example, tape strip 248 may be fed into upper left infeed slot 48, while the sheet 256 to which tape 248 is bound is folded double and may be fed into either lower right slot 46 and passed below horn 68 and wedge 60, or sheet 256's double layers may be fed through upper left slot beneath tape strip 248 and passed below horn and wedge 68 and 60.

Figure 26:
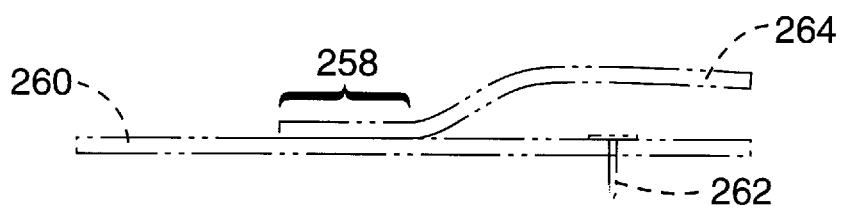
FIG. 26 is a schematic cross-section of a completed flap weld.

Flap weld 258, used in sloped roofing applications, and the like, wherein an under-flap portion of the sheet material 260 is fastened to an underlying surface with nails 262, is illustrated in FIG. 26. The alternative construction procedures for forming flap weld 258 are similar to those described above regarding taped reinforcement 254, except, as shown in FIG. 26, a flap strip of material 264 wider than tape strip 248 is used, and a substantial portion of flap strip 264 remains free and nonwelded to the underlying sheet 260.

Figure 27:
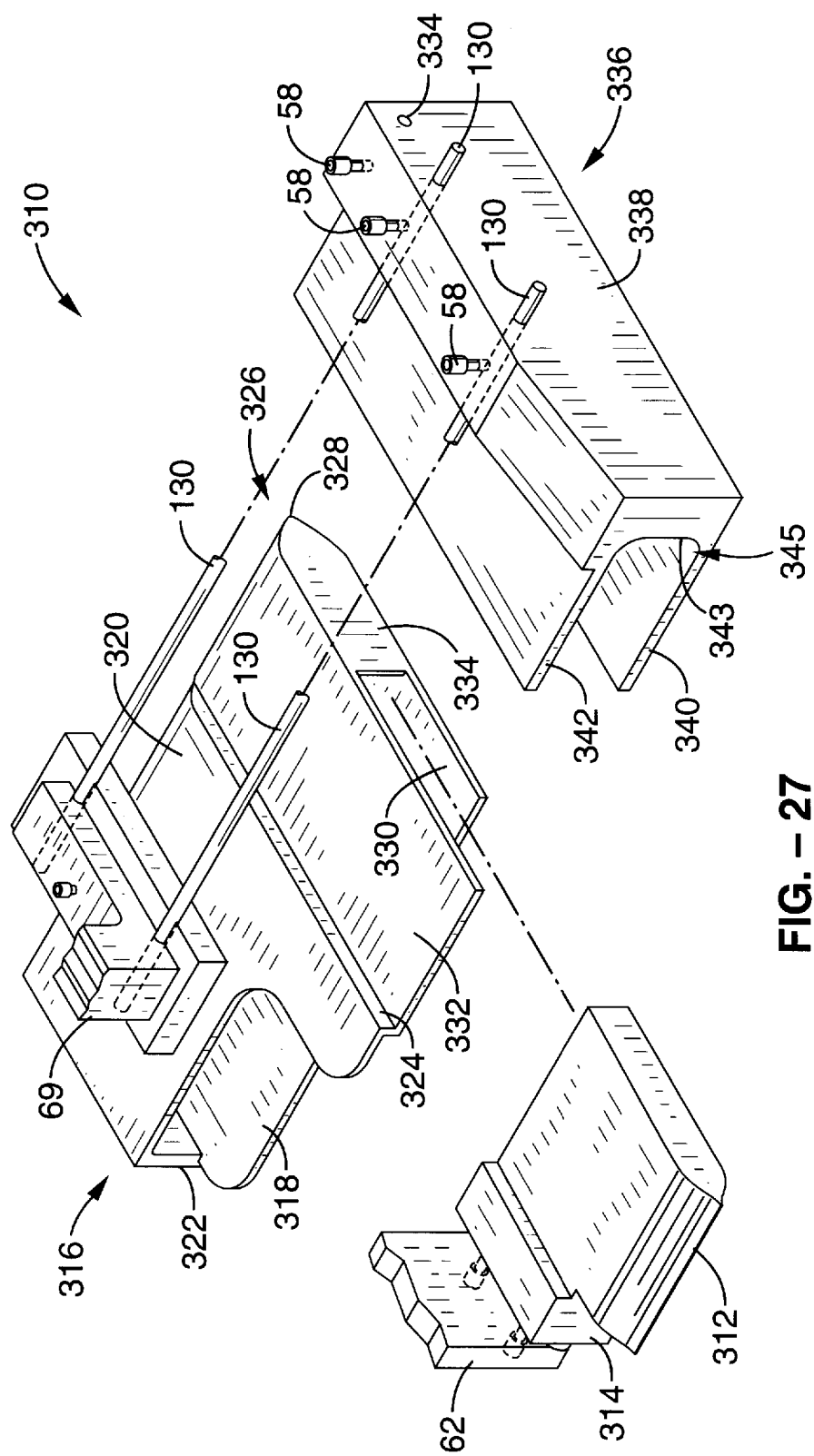
FIG. 27 is an exploded perspective view of an alternative hem cord apparatus.

As shown in FIGS. 27 and 28, alternative hem cord production apparatus 310 selectively replaces hot wedge 60, horn 98 and hot wedge parking shroud 70. And, when hem cord production apparatus 310 is in place, top right edge auxiliary guide 128, bottom left edge auxiliary guide 134, removable tab 140, horn width extender 148 and its associated support rods 150, push/pull tab 154, outer hem guide control rod 154, and outer hem guide 158 are not used. As further described below, the elements of which hem cord production apparatus 310 is comprised are mounted on vertical shaft 62, shroud support leg 69 and top guide support rods 130.

The right and left directional orientations established above with respect to right and left slots 46 and 48 are continued here. That is, right and left are determined from an upstream position, looking in a downstream direction.

Hem cord production apparatus 310 includes alternative thin hot wedge 32 mounted on extension block 314 which is, in turn, mounted to vertical shaft 62, vertical shaft 62 being as hereinabove described. That is, as wedge engaging handle 66 swings through a horizontal arc, thin hot wedge 312 does the same at shaft 62's lower end.

Alternative thin hot wedge 312 is thinner than hot wedge 60, i.e. it has less vertical height; and, although the left face of thin hot wedge 312 resides in alignment with left-hand faces 86 and 88 of rollers 72 and 74, respectively, just as the left face of hot wedge 60 did, thin hot wedge 312 is narrower in a left-to-right direction than hot wedge 60, as well. Thin hot wedge 312 is preferably about half the width of hot wedge 60. Thus, extension block 314 occupies a space between vertical shaft 62 and thin hot wedge 312 that was occupied by, roughly, the right-hand half of hot wedge 60. Reasons for these reduced dimensions of thin hot wedge 312 will become apparent below.

Hem cord production apparatus 310's parking shroud portion 316 is formed with an interior portion of sufficient dimension to house and protect thin hot wedge 312 and extension block 314 as wedge engaging handle 66 is operated to swing thin hot wedge 312 away from the nip of rollers 72 and 74. Parking shroud portion 316 is suspended from the lower end of shroud support leg 69. Parking shroud 316 includes a lower wall 318, an upper wall 320, a right-side wall 322 and a left-side panel 324.

The left-hand side of hem cord production apparatus 310 includes thin horn 326. Thin horn 326 projects from the left-hand side of parking shroud 316. Similar to horn 60, thin horn 326 covers the upstream end of thin hot wedge 312.

Thin horn 326 has a generally wedge-shaped upstream end 328 with its apex oriented in an upstream direction. Horizontal bottom wall 330 of thin horn 326 is contiguous with parking shroud 316's lower wall 318. Horizontal top wall 332 of thin horn 326 is suspended at a height lower than that of parking shroud 316's upper wall 320. Vertical left-side panel 324 of parking shroud 316's connects thin horn 326's top wall 332 with parking shroud 316's upper wall 320, and is generally perpendicular to both. Web 334 comprises a vertical wall between the left-most edges of thin horn 326's bottom ans top walls 330 and 332. Web 334 does not extend downstream as far as either bottom wall 330 or top wall 332 of thin horn 326. This leaves thin hot wedge 312's left side face (unnumbered) expose on the left side of thin horn 326.

The left-hand side of parking shroud 316's upper wall 320, parking shroud 316's left-side panel 324, and thin horn 326's top wall 332, all project a bit farther downstream than the rest of parking shroud 316 to cover and protect thin hot wedge 312 when it is in place and at working temperature adjacent the nip of rollers 72 and 74.

Outer hem cord guide 336 is supported on top guide support rods 130. Rods 130 remain in place projecting horizontally from the left side of the lower end of shroud support leg 69. Outer hem cord guide 336 is comprised of an outer generally rectangular block portion 338 with upper and lower rightward-projecting horizontal panels, 340 and 342, respectively. Outer block portion 338 is elongate and oriented parallel with welder 10's upstream/downstream axis. Outer hem cord guide 336 is slidable left and right on support rods 130, and can be locked in any desired location therealong with the two downstream-most guide lock screws 58 in the upper surface of outer block 338.

Lower and upper panels 340 and 342 are parallel to one another and have a vertical distance between them slightly greater than the vertical distance between the lower and upper walls 318 and 320 of parking shroud 316. Lower and upper panels 340 and 342 are positioned on and project rightward from block portion 338 such that when outer hem cord guide 336 is moved rightward slightly below bottom wall 330 of thin horn 326 and upper panel 342 is disposed slightly above thin form 326's top wall 332. That is, thin horn 326 nests between lower and upper panels 340 and 342. This relationship is shown in FIG. 28.

A right, inside wall 343 defines the leftward extent of the channel 345 between lower and upper panels 340 and 342. Inside wall 3442 comes close to abutting the left sides of thin hot wedge 311 and thin horn 326 as outer hem cord is moved rightward.

Outer block portion 338 of outer hem cord guide 336 includes an additional transverse aperture 344 able to receive a rod and push/pull tab (not shown) similar to push/pull tab 154 and outer hem guide control rod 156. A third, upstream-most guide lock screw 58 is provided over aperture 334 to lock outer hem cord guide 336 to such a control rod. Such a push/pull tab and rod combination would be operable to permit left and right control of outer hem cord guide 336's position from the push/pull tab located some distance to the right.

In use, in constructing a hem cord, outer hem cord guide 336 is first moved well to the left on support rods 130. Then, with drop handle 116 in its up position, the left edge 348 of a single, integral sheet of weldable material 350 is moved in a leftward direction into right infeed slot 46 of welder 10. Sheet 350 passes below parking shroud 316's lower wall 318 and below thin horn 326's bottom wall 330. Enough of sheet 350's left hand side should be drawn into slot to permit its left edge 348 to be folded back in a rightward direction to lie above thin horn 326. But, before being folded back, cord 346 comprised of a semi-rigid plastic rod, or the like, is positioned lateral to and directly against the left side of thin hot wedge 312 and the left-hand face of thin horn 326's left side web 334. Cord 346 overlies sheet 348. Cord 346 is oriented parallel with welder 10's upstream/downstream axis, as is the length of left edge 348 of sheet 350. With cord 346 so positioned, left sheet edge 348 is then folded back in a rightward direction to lie atop thin horn 326. And, left edge 348 should abut parking shroud 316's left side panel 324.

Then, outer hem cord guide 326 is moved rightward as far as possible and locked in place on support rods 130 with guide lock screws 58. Outer hem cord guide's lower and upper panels 340 and 342 hold material sheet 350 flat to thin horn 326's bottom and top walls 330 and 332. Right inside wall 343 abuts the outer surface of sheet 350 where it is folded around cord 346 and presses cord 346 against the left side of thin hot wedge 312 and the left-hand face of thin horn 326's left side web 334.

In forming a tight hem cord weld, it is important to achieve heating of the entirety of the opposing surfaces of sheet 350 which will be welded together. That is, with reference to FIG. 28, the portion of sheet 350 that remains unheated, i.e. shielded from thin hot wedge 312 behind cord 346, should be of a width slightly less than cord 346's circumference. This is best achieved by assuring that the vertical distance between outer hem cord guide's lower and upper panels 340 and 342 is just slightly greater than the diameter of cord 346, that the vertical height and positioning of thin horn 326 with respect to outer hem cord guide's lower and upper panels 340 and 342 allows a single layer of sheet material 350 to pass snugly but non-bindingly over and under horn 326, and by assuring that outer hem cord guide 336 is positioned as far right as possible without inhibiting the passage of either sheet 350 or cord 346 downstream through welder 10. In manufacturing hem cord production apparatus 310, the vertical distance between outer hem cord guide 336's lower and upper panels 340 and 342, and the heights of thin hot wedge 312 and thin horn 326, may be chosen for the exact diameter of the cord 346 and the thickness of sheet material 350 intended to be welded into a hem cord weld.

Leaving a portion of the left side of thin horn 326 open, to expose the left face of thin hot wedge 312, further assists in complete heating of the opposing material faces because heat radiates laterally from wedge 312, thus preheating portions of the sheet material 350 that will not be directly heated by passing over the beveled downstream faces of wedge 312.

The outer critical factor in achieving a tight hem cord weld is in assuring that the faces of thin hot wedge 312 and thin horn 326 are aligned with, i.e. in the same plane with, the left-hand faces 86 and 88 of rollers 72 and 74. That is, as heated sheet material is fed into rollers 72 and 74 it should be pressed an tightly as possible around the entirety of the circumference of cord 346. Thus, as shown in the hem cord weld 352 of FIG. 29, any gap 354 of unwelded material adjacent cord 346 should be minimal of nonexistent.

The foregoing detailed disclosure of the inventive welder 10 is considered as only illustrative of the preferred embodiment of, and not a limitation upon the scope of, the invention. Those skilled in the art will envision many other possible variations of the structure disclosed herein that nevertheless fall within the scope of the following claims. For example, a welder including opposing infeed slots arranged in an S-shaped configuration, and a welding wedge suspended from one of its ends so neither the wedge, nor its suspension, obstruct the open side of either infeed slot, would fall within the claims. Thus, a welder with an S-shaped channel configured as disclosed herein could, alternatively, have its welding wedge suspended from the base plate on the lower left, as long as the wedge and suspension were contiguous with the lower left base plate and not crossing over and/or obstructing the path of material feed through the welder. Conversely, a welder having the opposite S-shaped channel configuration, i.e. with lower left and upper right infeed slots, could have its wedge suspended from and contiguous with either the upper portion of the chassis (e.g. the motor housing or support arm) on the left side, or the lower portion of the chassis (e.g. the base plate) on the right, because neither of these suspension orientations would obstruct the open ends of the infeed slots. Thus, several different arrangements of the essential elements of the invention are possible without departing from the claims, and 90°-rotated versions of each are possible, as well. Pressure rollers on such welders may be oriented either horizontally or vertically, and may be operable such that either roller moves vertically with respect to the other, or such that either roller moves to and fro, i.e. side-to-side, with respect to the other. And, as those skilled in the sheet material welding art will comprehend, guides for any of the foregoing contemplated welder configurations would be of constructions analogous to those disclosed herein, but would be disposed and oriented appropriately to achieve the welds described. Thus, 180° rotated and mirror-image variations on the inventive welder are contemplated herein, as are 90°-rotated versions, and all are considered to fall within the claims.

And, alternative uses for this inventive welder may later be realized. For example, with the appropriate adjustments of temperature and other welding conditions, materials other than plastic sheeting, such as metallic compositions, and the like, may be welded in the manner described. And, the welding head employed may be an element other than a hot wedge if sheets of material other than weldable plastics will be bound to one another. For example, sheets of any composition able to be adhesively bound to one another could be so bound by a welder including a welding head which expresses an appropriate adhesive. In that case, the auxiliary guides and other mechanical elements described herein would function similarly but, in an adhesive-based welder, adhesive control apparatus would replace the heat delivery and control apparatus described herein. One variation thereupon is adhesive control apparatus for a two-part, resin and catalyst system, wherein resin is expressed from one side of the welding wedge and catalyst is expressed from the other.

Accordingly, the scope of the invention should be determined with reference to the appended claims, and not by the examples which have herein been given.

I claim:

1. A seam welder, comprising:
   a. a chassis, said chassis having an S-shaped configuration with opposed, open-sided infeed slots, said chassis further including an upstream end, and an opposing downstream end;
   b. means for moving weldable sheet material through said welder from said upstream end through said downstream end; and,
   c. a welding wedge disposed downstream from said infeed slots, said welding wedge having opposed ends and being suspended from a first of said ends upon suspension, such that neither said wedge nor said suspension obstructs open sides of said infeed slots.

2. The welder of claim 1, wherein said welding wedge is retractable into a shroud upstream from a welding position of said welding wedge.

3. The welder of claim 2, wherein, when said welding wedge is in said welding position, said shroud guides sheet material above and below said welding wedge.

4. The welder of claim 1, wherein a first of said infeed slots is a right slot and a second of said slots is a left slot.

5. The welder of claim 4, further including means for guiding a left edge portion of a sheet of weldable material in said right slot past a lower surface of said welding wedge, and for simultaneously guiding a right edge portion of a sheet of weldable material in said left slot past an upper surface of said welding wedge.

6. The welder of claim 4, further including means for guiding a right edge portion of a first sheet of weldable material in said left slot past a lower surface of said welding wedge, and for simultaneously guiding a right edge portion of a second sheet of weldable material in said left slot past an upper surface of said welding wedge.

7. The welder of claim 4, further including means for guiding a left edge portion of a sheet of weldable material in said right slot past an upper surface of said welding wedge, while simultaneously guiding a portion first adjacent to said sheet's left edge portion past a left end of said welding wedge, and while further simultaneously guiding a portion second adjacent to said sheet's left edge portion past a lower surface of said welding wedge.

8. The welder of claim 1, wherein a first of said infeed slots is a left slot and a second of said slots is a right slot.

9. The welder of claim 8, further including means for guiding a right edge portion of a sheet of weldable material in said left slot past a lower surface of said welding wedge, and for simultaneously guiding a left edge portion of a sheet of weldable material in said right slot past an upper surface of said welding wedge.

10. The welder of claim 8, further including means for guiding a left edge portion of a first sheet of weldable material in said right slot past a lower surface of said welding wedge, and for simultaneously guiding a left edge portion of a second sheet of weldable material in said right slot past an upper surface of said welding wedge.

11. The welder of claim 8, further including means for guiding a right edge portion of a sheet of weldable material in said left slot past an upper surface of said welding wedge, while simultaneously guiding a portion first adjacent to said sheet's right edge portion past a right end of said welding wedge, and while further simultaneously guiding a portion second adjacent to said sheet's right edge portion past a lower surface of said welding wedge.

12. A seam welder, comprising:
   a. a chassis, said chassis having an upstream end, and an opposing downstream end;
   b. means for moving weldable sheet material through said welder from said upstream end through said downstream end;
   c. means for feeding sheet material into said upstream end in a first plane, said first plane feeding means comprising a slot in said chassis, said slot having an open side for receipt of a material sheet of unlimited width;
   d. means for feeding sheet material into said upstream end in a second plane, said second plane feeding means comprising a slot in said chassis overlapping said slot of said first plane feeding means having an open side for receipt of a material sheet of unlimited width;

e. means disposed downstream from said second sheet feeding means for welding sheet portions to one another, said welding means having opposed first and second welding surfaces and opposed first and second ends, said welding means being suspended by its first end from suspension connected to said chassis;

f. means for guiding first and second sheet portions past said first and second welding surfaces, respectively, of said welding means; and, g. means downstream from said welding means for bringing opposed surfaces of said first and second sheet portions into contact with one another.

13. The welder of claim 12, wherein said second plane is generally parallel to said first plane.

14. The welder of claim 12, wherein said welding means is suspended in a third plane generally between said first and second planes.

15. The welder of claim 12, wherein said welding means comprises a hot wedge.

16. The welder of claim 12, wherein said guiding means comprises a shroud upstream from said welding means.

17. The welder of claim 12, wherein said welding means is retractable into said guiding means.

18. The welder of claim 12, wherein said guiding means has first and second sides, said sides being oriented adjacent said welding means' first and second ends, respectively, said guiding means being suspended by its first side from said welding means' suspension.

19. The welder of claim 12, further including means extensible from said guiding means to increase the effective width of the guiding means.

20. The welder of claim 19, wherein said guiding means' width-increasing means comprises a side panel variably positionable between positions close to or away from said guiding means.

21. The welder of claim 19, wherein said guiding means has first and second sides, said sides being oriented adjacent said welding means' first and second ends, respectively, said guiding means being suspended by its first side from said welding means' suspension, and wherein said width-increasing means comprises a side panel variably positionable between positions close to or away from said guiding means' second side.

22. The welder of claim 12, further including a hem weld guide variably positionable between positions close to or away from said guiding means.

23. The welder of claim 22, wherein said hem weld guide comprises a panel variably positionable between positions close to or away from said guiding means.

24. The welder of claim 22, wherein said guiding means has first and second sides, said sides being oriented adjacent said welding means' first and second ends, respectively, said guiding means being suspended by its first side from said welding means' suspension, and wherein said hem weld guide comprises a panel variably positionable between positions close to or away from said guiding means' second side.

25. The welder of claim 12, further including means for accurate centering of said welding means with respect to said means for bringing said sheets' opposed surfaces into contact with one another.

26. The welder of claim 25, wherein said means for bringing opposed surfaces of said first and second sheet portions into contact with one another are linked, via linking means, for synchronous movement with said accurate centering means for said welding means.

27. The welder of claim 26, wherein said linking means comprises a cam, means for selectively positioning said cam, and first and second means for following said cam, said first cam following means being engaged with said cam and with said means for bringing opposed surfaces of said first and second sheet portions into contact with one another, said second cam following means being engaged with said cam and with said welding means' accurate centering means.

28. The welder of claim 27, wherein said cam is comprised of a cam plate with cam slots therein, and wherein said first and second cam following means engage said cam slots.

29. The welder of claim 28, wherein said cam plate is selectively positionable along a line of travel, and wherein said cam slots are disposed on angles in relation to said line of travel.

30. The welder of claim 29, wherein a first cam slot is disposed on an angle, in relation to said line of travel, twice that of an angle on which a second cam slot is disposed.

31. The welder of claim 30, wherein said first cam slot is disposed on approximately a 28° angle in relation to said line of travel, and wherein said second slot is disposed on approximately a 14° angle in relation to said line of travel.

32. The welder of claim 30, wherein said first cam following means is engaged with said first cam slot, and wherein said second cam following means is engaged with said second cam slot.

33. The welder of claim 12, wherein said means for bringing opposed surfaces of said first and second sheet portions into contact with one another includes first and second pressure producing elements, said first pressure producing element being selectively movable in opposed first and second directions toward and away from said second pressure producing element.

34. The welder of claim 33, wherein said welding means is selectively movable in opposed first and second directions toward and away from a welding position.

35. The welder of claim 34, wherein when said welding means is moved a distance, said first pressure producing element moves twice that distance.

36. The welder of claim 34, wherein, in said welding position, said first and second pressure producing elements are occluded and an apex of said welding means is against, and aligned between, said first and second pressure producing elements.

37. The welder of claim 12, wherein said sheet material moving means comprises a pair of cylindrical rollers downstream from said welding means, and wherein said welding means includes a downstream apex, said rollers having a line of occlusion between them, said welding means being self-centering in that plane which is at a tangent to both of said rollers surfaces at their line of occlusion.

38. The welder of claim 12, further including a shroud upstream from said welding means, and further including means for increasing said shroud's width.

39. The welder of claim 38, wherein said shroud width-increasing means comprises a side panel of said shroud, said side panel being adapted to be variably positioned between points close to or away from said body of said shroud.

40. A seam welder, comprising:

a. a chassis, said chassis having an upstream end, and an opposing downstream end, said chassis also being divided into a first chassis portion and an opposing second chassis portion, said chassis also having a first side and an opposing second side;

b. means for moving weldable sheet material through said welder from said upstream end through said downstream end;

c. means for feeding sheet material into said upstream end in a first plane, said first plane feeding means having an open side for receipt of a material sheet of unlimited width, and a closed side for limiting movement of said material sheet in a direction therebeyond;

d. means for feeding sheet material into said upstream end in a second plane, said second plane feeding means having an open side for receipt of a material sheet of unlimited width, and a closed side for limiting movement of said material sheet in a direction therebeyond;

e. means for dividing said first plane feeding means from said second plane feeding means, wherein said dividing means has a first side on said first side of said chassis which is contiguous with said first plane feeding means' closed side, and which is also contiguous with said first chassis portion, and wherein said dividing means has a second side on said second side of said chassis which is contiguous with said second plane feeding means' closed side;

f. means disposed downstream from said dividing means for welding sheet portions to one another, said welding means having opposed first and second welding surfaces, and also having opposed first and second ends, said ends being oriented toward said first and second sides of said chassis, respectively, said welding means being suspended from said first chassis portion by said first end on means for suspension from said chassis, wherein said suspension means is contiguous with said first chassis portion and disposed on said first side of said chassis;

g. means for guiding first and second sheet portions past said first and second welding surfaces, respectively, of said welding means; and, h. means downstream from said welding means for bringing opposed surfaces of said first and second sheet portions into contact with one another.

41. Hem cord production apparatus, comprising:
a. a hot wedge;
b. means for moving weldable sheet material from upstream to downstream, past said hot wedge;
c. a horn upstream from said hot wedge, wherein said horn covers an upstream end, top and bottom faces, and a first side face of said hot wedge, yet leaves a second side face of said hot wedge exposed;
d. a guide adjacent said exposed face of said hot wedge, said guide comprising:
   i. a wall opposing said exposed face of said hot wedge;
   ii. a lower panel projecting parallel to, and residing a short distance below, a bottom face of said horn;
   iii. an upper panel projecting parallel to, and residing a short distance above, a top face of said horn; and,
e. means downstream from said guide for bringing opposed surfaces of sheet material traveling above and below said horn into contact with one another whereby, when a length of cord in upstream to downstream orientation is laid against said hot wedge's exposed face, and an integral piece of weldable sheet material is folded to lie between said horn's bottom face and said lower guide panel therebelow, between said horn's top face and said upper guide panel thereabove, and between said cord and said opposing wall of said guide such that said opposing wall presses said cord against said hot wedge's exposed side face, said piece of weldable sheet material and said cord pass said hot wedge and downstream from said hot wedge result in said cord being bound into a tight channel formed in said sheet material.

42. The apparatus of claim 41, further including means for moving said guide toward and away from said exposed side face of said hot wedge.

43. The apparatus of claim 41, wherein said means for bringing opposed surfaces of sheet material together comprises a pair of rollers having end faces residing in a plane parallel to said hot wedge's exposed face.

44. A seam welder, comprising:
a. a chassis having opposed, open-sided, overlapping infeed slots, said chassis further including an upstream end, and an opposing downstream end;
b. means for moving weldable sheet material through said welder from said upstream end through said downstream end; and,
c. a welding wedge disposed downstream from said infeed slots, said welding wedge having opposed ends and being suspended from a first of said ends upon suspension, such that neither said wedge nor said suspension obstructs open sides of said infeed slots.

* * * * *